(12) United States Patent
Zhou et al.

(10) Patent No.: US 8,842,730 B2
(45) Date of Patent: Sep. 23, 2014

(54) METHODS AND SYSTEMS FOR DIGITALLY RE-MASTERING OF 2D AND 3D MOTION PICTURES FOR EXHIBITION WITH ENHANCED VISUAL QUALITY

(75) Inventors: Samuel Zhou, Mississauga (CA); Paul Judkins, Toronto (CA); Ping Ye, Mississauga (CA)

(73) Assignee: IMAX Corporation, Mississauga, ON ( * ) Notice: Subject to any disclaimer, the term of this patent is extended or adjusted under 35 U.S.C. 154(b) by 1072 days.

(21) Appl. No.: 12/160,313

(22) PCT Filed: Jan. 29, 2007

(86) PCT No.: PCT/IB2007/000188

§ 371 (c)(1),
(2), (4) Date: Aug. 22, 2008

(87) PCT Pub. No.: WO2007/085950

PCT Pub. Date: Aug. 2, 2007

(65) Prior Publication Data

US 2010/0231593 A1    Sep. 16, 2010

Related U.S. Application Data

(60) Provisional application No. 60/762,964, filed on Jan. 27, 2006.

(51) Int. Cl.
*H04N 7/12* (2006.01)
*H04N 19/51* (2014.01)
*G06T 3/40* (2006.01)
*H04N 19/527* (2014.01)
*H04N 19/59* (2014.01)
*G06T 7/20* (2006.01)
*H04N 13/00* (2006.01)
*H04N 19/577* (2014.01)
*H04N 5/253* (2006.01)
*H04N 7/01* (2006.01)

(52) U.S. Cl.
CPC ........ *G06T 7/2066* (2013.01); *H04N 19/00745* (2013.01); *G06T 3/4007* (2013.01); *H04N 7/0127* (2013.01); *H04N 7/0112* (2013.01); *H04N 19/00593* (2013.01); *H04N 19/00757* (2013.01); *G06T 7/2006* (2013.01); *H04N 13/0029* (2013.01); *G06T 7/2073* (2013.01); *H04N 19/00721* (2013.01); *H04N 19/00696* (2013.01); *H04N 5/253* (2013.01)
USPC ..................................................... 375/240.12

(58) Field of Classification Search
USPC ....................................................... 375/240.12
See application file for complete search history.

(56) References Cited

U.S. PATENT DOCUMENTS

| | | |
|---|---|---|
| 3,740,115 A | 6/1973 | Cole |
| 4,141,624 A | 2/1979 | Siegmund |
| 4,154,502 A | 5/1979 | Siegmund |
| 4,359,759 A | 11/1982 | McBride et al. |
| 4,378,952 A | 4/1983 | Siegmund |
| 4,570,308 A | 2/1986 | Weisgerber |
| 4,677,483 A * | 6/1987 | Dischert et al. ............... 348/448 |
| 4,794,714 A | 1/1989 | Weisgerber |
| 4,889,423 A | 12/1989 | Trumbull |
| 4,925,294 A | 5/1990 | Geshwind et al. |
| 5,096,286 A | 3/1992 | Weisgerber |
| 5,121,977 A | 6/1992 | Weisgerber |
| 5,236,302 A | 8/1993 | Weisgerber et al. |
| 5,259,040 A | 11/1993 | Hanna |
| 5,288,210 A | 2/1994 | Albrecht et al. |
| 5,313,604 A * | 5/1994 | Godwin ........................ 711/162 |
| 5,325,449 A | 6/1994 | Burt et al. |
| 5,338,154 A | 8/1994 | Meade et al. |
| 5,379,369 A | 1/1995 | Komma et al. |
| 5,472,313 A | 12/1995 | Quinones et al. |
| 5,488,674 A | 1/1996 | Burt et al. |
| 5,510,832 A | 4/1996 | Garcia |
| 5,541,660 A * | 7/1996 | Kim et al. ................. 375/240.16 |
| 5,589,852 A | 12/1996 | Thompson et al. |
| 5,600,731 A | 2/1997 | Sezan et al. |
| 5,627,614 A | 5/1997 | Weisgerber |
| 5,629,988 A | 5/1997 | Burt et al. |
| 5,649,032 A | 7/1997 | Burt et al. |
| 5,682,437 A | 10/1997 | Okino et al. |

| | | | | | | |
|---|---|---|---|---|---|---|
| 5,694,491 | A | 12/1997 | Brill et al. | 2002/0035432 A1 | 3/2002 | Kubica et al. |
| 5,719,966 | A | 2/1998 | Brill et al. | 2002/0110275 A1 | 8/2002 | Rogina et al. |
| 5,738,430 | A | 4/1998 | Brill | 2002/0136293 A1 | 9/2002 | Washino |
| 5,739,844 | A | 4/1998 | Kuwano et al. | 2002/0149696 A1 | 10/2002 | Cok et al. |
| 5,739,894 | A | 4/1998 | Weisgerber | 2003/0011746 A1 | 1/2003 | Goodhill et al. |
| 5,745,213 | A | 4/1998 | Goodhill et al. | 2003/0016750 A1 | 1/2003 | Cok |
| 5,748,199 | A | 5/1998 | Palm | 2003/0036974 A1* | 2/2003 | Allen ............... 705/27 |
| 5,790,686 | A | 8/1998 | Koc et al. | 2003/0043344 A1 | 3/2003 | Goodhill et al. |
| 5,812,245 | A | 9/1998 | Goodhill et al. | 2003/0048419 A1 | 3/2003 | Goodhill et al. |
| 5,835,627 | A | 11/1998 | Higgins et al. | 2003/0050940 A1* | 3/2003 | Robinson ............. 707/204 |
| 5,841,512 | A | 11/1998 | Goodhill | 2003/0095704 A1* | 5/2003 | Risson ................. 382/162 |
| 5,864,366 | A * | 1/1999 | Yeo ............... 375/240.12 | 2003/0128871 A1* | 7/2003 | Naske et al. ........... 382/154 |
| 5,909,516 | A | 6/1999 | Lubin | 2003/0169404 A1 | 9/2003 | Weisgerber |
| 5,946,041 | A | 8/1999 | Morita | 2003/0204384 A1* | 10/2003 | Owechko et al. ............. 703/1 |
| 5,946,076 | A | 8/1999 | Goodhill et al. | 2004/0017510 A1 | 1/2004 | Honda et al. |
| 5,963,664 | A | 10/1999 | Kumar et al. | 2004/0022318 A1 | 2/2004 | Garrido et al. |
| 5,974,159 | A | 10/1999 | Lubin et al. | 2004/0046864 A1 | 3/2004 | Gross et al. |
| 5,978,029 | A | 11/1999 | Boice et al. | 2004/0046891 A1 | 3/2004 | Mishima et al. |
| 5,999,220 | A | 12/1999 | Washino | 2004/0057015 A1 | 3/2004 | Goodhill et al. |
| 6,019,473 | A | 2/2000 | Goodhill et al. | 2004/0066491 A1 | 4/2004 | Goodhill et al. |
| 6,031,564 | A | 2/2000 | Ma et al. | 2004/0130680 A1* | 7/2004 | Zhou et al. ................ 352/38 |
| 6,061,477 | A | 5/2000 | Lohmeyer et al. | 2004/0136686 A1 | 7/2004 | Kono et al. |
| 6,067,125 | A | 5/2000 | May | 2004/0201777 A1 | 10/2004 | Zhu et al. |
| 6,072,907 | A | 6/2000 | Taylor et al. | 2004/0202445 A1 | 10/2004 | DiFrancesco |
| 6,075,884 | A | 6/2000 | Lubin et al. | 2004/0223640 A1* | 11/2004 | Bovyrin ................. 382/154 |
| 6,108,005 | A | 8/2000 | Starks et al. | 2004/0227851 A1 | 11/2004 | Min et al. |
| 6,130,660 | A | 10/2000 | Imsand | 2004/0236807 A1 | 11/2004 | Hsiung et al. |
| 6,130,717 | A | 10/2000 | Arai et al. | 2004/0246374 A1 | 12/2004 | Mishima et al. |
| 6,137,904 | A | 10/2000 | Lubin et al. | 2004/0252230 A1 | 12/2004 | Winder et al. |
| 6,141,459 | A | 10/2000 | Gendel | 2004/0252759 A1* | 12/2004 | John Winder et al. ... 375/240.12 |
| 6,173,070 | B1* | 1/2001 | Michael et al. ......... 382/145 | 2005/0002456 A1 | 1/2005 | Min et al. |
| 6,191,809 | B1 | 2/2001 | Hori et al. | 2005/0024589 A1 | 2/2005 | Goodhill et al. |
| 6,208,348 | B1 | 3/2001 | Kaye | 2005/0036113 A1 | 2/2005 | Goodhill et al. |
| 6,215,516 | B1 | 4/2001 | Ma et al. | 2005/0053291 A1 | 3/2005 | Mishima et al. |
| 6,219,462 | B1 | 4/2001 | Anandan et al. | 2005/0105001 A1 | 5/2005 | Yui et al. |
| 6,229,570 | B1 | 5/2001 | Bugwadia et al. | 2005/0146521 A1 | 7/2005 | Kaye et al. |
| 6,243,156 | B1 | 6/2001 | Weisgerber | 2005/0226529 A1 | 10/2005 | Kondo |
| 6,266,092 | B1 | 7/2001 | Wang et al. | 2005/0254011 A1 | 11/2005 | Weisgerber |
| 6,269,175 | B1 | 7/2001 | Hanna et al. | 2005/0265451 A1 | 12/2005 | Shi et al. |
| 6,295,322 | B1* | 9/2001 | Arbeiter et al. ......... 375/240.29 | 2006/0120451 A1* | 6/2006 | Hannuksela ............. 375/240.12 |
| 6,298,090 | B1 | 10/2001 | Challapali et al. | 2006/0165179 A1* | 7/2006 | Feuer et al. ............. 375/240.18 |
| 6,326,999 | B1 | 12/2001 | Wise | 2007/0019883 A1 | 1/2007 | Wong et al. |
| 6,351,545 | B1 | 2/2002 | Edelson et al. | 2008/0055490 A1* | 3/2008 | Yasuda et al. ................. 348/739 |
| 6,370,198 | B1 | 4/2002 | Washino | 2009/0115901 A1 | 5/2009 | Winter et al. |
| 6,442,203 | B1 | 8/2002 | Demos | 2009/0116732 A1 | 5/2009 | Zhou et al. |
| 6,450,644 | B1 | 9/2002 | Goodhill et al. | 2009/0303247 A1 | 12/2009 | Zhang et al. |
| 6,477,267 | B1 | 11/2002 | Richards | 2010/0182406 A1 | 7/2010 | Benitez |
| 6,487,304 | B1 | 11/2002 | Szeliski | 2011/0069152 A1 | 3/2011 | Wang et al. |
| 6,496,598 | B1 | 12/2002 | Harman | 2012/0056984 A1 | 3/2012 | Zhang et al. |
| 6,515,659 | B1 | 2/2003 | Kaye et al. | 2013/0169749 A1 | 7/2013 | Zhou et al. |
| 6,522,787 | B1 | 2/2003 | Kumar et al. | | | |
| 6,549,240 | B1 | 4/2003 | Reitmeier | | | |
| 6,560,281 | B1 | 5/2003 | Black et al. | | | |
| 6,573,912 | B1 | 6/2003 | Suzuki et al. | | | |
| 6,590,573 | B1 | 7/2003 | Geshwind | | | |
| 6,618,439 | B1 | 9/2003 | Kuo et al. | | | |
| 6,625,333 | B1 | 9/2003 | Wang et al. | | | |
| 6,686,926 | B1 | 2/2004 | Kaye | | | |
| 6,728,317 | B1 | 4/2004 | Demos | | | |
| 6,806,898 | B1 | 10/2004 | Toyama et al. | | | |
| 6,856,314 | B2 | 2/2005 | Ng | | | |
| 6,900,846 | B2 | 5/2005 | Lee et al. | | | |
| 6,950,462 | B2 | 9/2005 | Watabe et al. | | | |
| 6,968,006 | B1 | 11/2005 | Puri et al. | | | |
| 6,992,700 | B1 | 1/2006 | Sato et al. | | | |
| 7,006,157 | B2 | 2/2006 | Sohn | | | |
| 7,079,697 | B2 | 7/2006 | Zhou | | | |
| 7,119,837 | B2* | 10/2006 | Soupliotis et al. ....... 348/208.99 | | | |
| 7,227,125 | B2 | 6/2007 | Sannomiya et al. | | | |
| 7,227,896 | B2 | 6/2007 | Sun | | | |
| 7,254,265 | B2 | 8/2007 | Naske et al. | | | |
| 7,260,274 | B2 | 8/2007 | Sawhney et al. | | | |
| 7,609,888 | B2 | 10/2009 | Sun et al. | | | |
| 7,689,031 | B2 | 3/2010 | Berretty et al. | | | |
| 7,856,055 | B2 | 12/2010 | Zhou et al. | | | |
| 8,411,931 | B2 | 4/2013 | Zhou et al. | | | |
| 2001/0031003 | A1 | 10/2001 | Sawhney et al. | | | |
| 2001/0043310 | A1 | 11/2001 | Goodhill et al. | | | |
| 2002/0021412 | A1 | 2/2002 | Goodhill et al. | | | |

FOREIGN PATENT DOCUMENTS

| | | |
|---|---|---|
| CA | 2279797 | 2/2001 |
| CA | 2 430 591 C | 6/2002 |
| CA | 2478671 | 9/2011 |
| CN | 101375315 | 2/2009 |
| CN | 101479765 | 7/2009 |
| CN | 102685533 | 9/2012 |
| CN | ZL038100576 | 9/2012 |
| EP | 0037722 A1 | 10/1981 |
| EP | 0475499 A1 | 11/1995 |
| EP | 0742674 | 11/1996 |
| EP | 0595895 | 12/1997 |
| EP | 0879441 | 11/1998 |
| EP | 0920652 | 6/1999 |
| EP | 0665697 | 5/2000 |
| EP | 1002257 | 5/2000 |
| EP | 0637889 A2 | 1/2001 |
| EP | 1084451 | 3/2001 |
| EP | 1164792 A2 | 12/2001 |
| EP | 0735512 | 6/2002 |
| EP | 1217839 A2 | 6/2002 |
| EP | 1234447A0 | 8/2002 |
| EP | 1235426 A2 | 8/2002 |
| EP | 1237370 A2 | 9/2002 |
| EP | 1247138A0 | 10/2002 |
| EP | 1 354 292 A1 | 10/2003 |
| EP | 1397003 A1 | 3/2004 |

| | | | |
|---|---|---|---|
| EP | 1455338 A1 | 9/2004 |
| EP | 0837601 A2 | 12/2004 |
| EP | 1503582 A1 | 2/2005 |
| EP | 1519358 A2 | 3/2005 |
| EP | 1549054 A2 | 6/2005 |
| EP | 1571854 | 7/2005 |
| EP | 1583364 A1 | 10/2005 |
| EP | 1585326 A1 | 10/2005 |
| EP | 2033164AO | 3/2009 |
| EP | 2160037 | 3/2010 |
| GB | 2009959 A | 6/1979 |
| GB | 2081923 A | 2/1982 |
| GB | 2162018 A | 1/1986 |
| GB | 2210237 A | 6/1989 |
| GB | 2215936 A | 9/1989 |
| GB | 2280080 A | 1/1995 |
| GB | 2343316 A | 5/2000 |
| IN | 283597 | 3/2003 |
| JP | 6102484 | 4/1994 |
| JP | 7311427 | 11/1995 |
| JP | 9281439 | 10/1997 |
| JP | 9319869 | 12/1997 |
| JP | 4201165 | 7/2004 |
| JP | 2004274219 | 9/2004 |
| JP | 2004297719 | 10/2004 |
| JP | 2004312669 | 11/2004 |
| JP | 2004343715 | 12/2004 |
| JP | 2004348117 | 12/2004 |
| JP | 2004357215 | 12/2004 |
| JP | 2005051389 | 2/2005 |
| JP | 2005057809 | 3/2005 |
| JP | 2005124167 | 5/2005 |
| JP | 2005204075 | 7/2005 |
| JP | 2005210697 | 8/2005 |
| JP | 20060102484 | 10/2007 |
| WO | WO 93/02529 | 2/1993 |
| WO | WO 93/07585 | 4/1993 |
| WO | WO 93/23823 | 11/1993 |
| WO | WO 94/10675 | 5/1994 |
| WO | WO 96/15508 | 5/1996 |
| WO | WO 97/01135 | 1/1997 |
| WO | 9724000 | 7/1997 |
| WO | WO 97/24000 | 7/1997 |
| WO | WO 97/29401 | 8/1997 |
| WO | WO 97/37323 | 10/1997 |
| WO | WO 98/02844 | 1/1998 |
| WO | WO 98/08140 | 2/1998 |
| WO | WO 98/21690 | 5/1998 |
| WO | WO 98/52356 | 11/1998 |
| WO | WO 99/08155 | 2/1999 |
| WO | 9912127 | 3/1999 |
| WO | WO 99/12127 | 3/1999 |
| WO | WO 99/56175 | 11/1999 |
| WO | WO 00/13423 | 3/2000 |
| WO | WO 00/38434 | 6/2000 |
| WO | WO 01/28238 | 4/2001 |
| WO | WO 01/35657 | 5/2001 |
| WO | WO 01/51987 | 7/2001 |
| WO | WO 02/03687 | 1/2002 |
| WO | WO 02/12143 | 2/2002 |
| WO | WO 02/45003 | 6/2002 |
| WO | WO 03/077549 | 9/2003 |
| WO | WO 2005/109899 | 11/2005 |
| WO | WO 2007/085950 | 8/2007 |
| WO | WO 2007/148219 | 12/2007 |

OTHER PUBLICATIONS

Shot—Definition. Merriam-Webster Dictionary. Nov. 8, 2012. <www.merriam-webster.com/dictionary/shot>. pp. 1-4.*
Indian Application No. 1303/KOLNP/2004, Office Action mailed on Sep. 26, 2006, 4 pages.
Canadian Application No. 2,430,591, Notice of Allowance mailed on Jan. 6, 2011, 1 Page.
Chinese Application No. 200780023673.7, Office Action mailed on Apr. 1, 2011, 3 Pages.
Supplementary European Search Report for Application No. 01989802.2, dated Mar. 23, 2009.
Kumar, et al., "3D Manipulation of Motion Imagery," Image Processing, 2000. Proceedings. 2000 International Conference on Sep. 10-13, 2000, Piscataway, NJ, USA, IEEE, pp. 17-20, Sarnoff Corporation.
Sawhney, "Hybrid Stereo Camera: An IBR Approach for Synthesis of Very High Resolution Stereoscopic Image Sequences," Computer Graphics. Siggraph 2001. Conference Proceedings, Los Angeles, CA, Aug. 12-17, 2001, pp. 451-460.
Chinese Application No. 200780003734.3, Office Action mailed on Aug. 6, 2010, 15 Pages of Office Action and 2 Pages of English Translation.
European Application No. 01 989 802.2-2218, Communication pursuant to Article 94(3) EPC mailed on Sep. 9, 2010, 4 pages.
European Patent Application No. 07789439.2, Extended European Search Report, mailed Oct. 14, 2010 (6 pages).
European Patent Application No. 09153591.4, Extended European Search Report, mailed Oct. 14, 2010 (8 pages).
Ahmadi, et al., "Improved Algorithms for Phase Prediction and Frame Interpolation in Low Bit Rate Sinusoidal Coders", Conference Record of Thirty-Second Asilomar Conference on Signals, Systems and Computers, 1998, vol. 1, pp. 362-366.
Al-Mualla, et al., "Motion Field Interpolation for Frame Rate Conversion", Proceedings of the IEEE International Symposium on Circuits and Systems, 2003, vol. 2, pp. 652-655.
Bagnara, et al., "Frame Interpolation in Low Bit Rate Coding by 3D Motion Estimation", Image and Multidimensional Digital Signal Processing, 1998, pp. 127-130.
Biswas, et al., "A Novel Motion Estimation Algorithm Using Phase Plane Correlation for Frame Rate Conversion", Conference Record of the Thirty-Sixth Asilomar Conference on Signals, Systems and Computers, 2002, vol. 1, pp. 492-496.
Castagno, et al., "A Method for Motion Adaptive Frame Rate Up-Conversion", IEEE Transactions on Circuits and Systems for Video Technology, Oct. 1996, vol. 6, No. 5, pp. 436-446.
Chen, et al., "A New Frame Interpolation Scheme for Talking Head Sequences", Proceeings. International Conference on Image Processing, 1995, vol. 2, pp. 591-594.
Dane, et al., "Encoder-Assisted Adaptive Video Frame Interpolation", IEEE International Conference on Acoustics, Speech and Signal Processing, 2005, vol. 2, pp. 349-352.
Dane, et al., "Motion Vector Processing for Frame Rate Up Conversion", IEEE International Conference on Acoustics, Speech and Signal Processing, 2004, vol. 3, pp. 309-312.
Ha, et al., "Motion Compensated Frame Interpolation by New Block-Based Motion Estimation Algorithm", IEEE Transactions on Consumer Electronics, May 2004, vol. 50, No. 2, pp. 752-759.
Ha, et al., "Motion Compensated Frame Rate Conversion by Overlapped Block-Based Motion Estimation Algorithm", IEEE International Symposium on Consumer Electronics, 2004, pp. 345-350.
Hilman, et al., "Using Motion-Compensated Frame-Rate Conversion for the Correction of 3:2 Pulldown Artifacts in Video Sequences", IEEE Transactions on Circuits and Systems for Video Technology, Sep. 2000, vol. 10, No. 6, pp. 869-877.
Jeon, et al., "Coarse-To-Fine Frame Interpolation for Frame Up-Conversion Using Pyramid Structure", IEEE Transactions on Consumer Electronics, Aug. 2003, vol. 49, No. 3, pp. 499-508.
Karim, et al., "Low Rate Video Frame Interpolation—Challenges and Solutions", IEEE International Conference on Acoustic, Speech and Signal Processing, vol. 3, pp. 117-120.
Karim, et al., "Multiresolution Motion Estimation for Low-Rate Video Frame Interpolation", EURASIP Journal on Applied Signal Processing, 2004, No. 11, pp. 1708-1720.
Kim, et al., "A New Video Interpolation Technique Based on Motion-Adaptive Subsampling", Digest of Technical Papers, International Conference on Consumer Electronics, 1999, pp. 370-371.
Kim, et al., "A New Video Interpolation Technique Based on Motion-Adaptive Subsampling", IEEE Transactions on Consumer Electronics, Aug. 1999, vol. 45, No. 3, pp. 782-787.
Krishnamurthy, et al., "Frame Interpolation and Bidirectional Prediction of Video Using Compactly encoded Optical-Flow fields and Label Fields", IEEE Transactions on Circuits and Systems for Video Technology, Aug. 1999, vol. 9, No. 5, pp. 713-726.

Kuo, et al., "Motion-Compensated Frame Interpolation Scheme for H.263 Codec", Proceeding of the IEEE International Symposium on Circuits and Systems VLSI, 1999, vol. 4, pp. 491-494.

Lagendijk, et al., "Motion Compensated Frame Rate Conversion of Motion Pictures", IEEE International Conference on Acoustics, Speech and Signal Processing, 1992, vol. 3, pp. 453-456.

Lee, et al., "Hierarchical Motion Compensated Frame Rate Up-Conversion Based on the Gaussian/Laplacian Pyramid", Digest of Technical Papers, International Conference on Consumer Electronics, 2003, pp. 350-351.

Liu, et al., "Frame Interpolation Scheme Using Inertia Motion Prediction", Signal Processing: Image Communication, Mar. 2003, vol. 18, No. 3, pp. 221-229.

Mishima, et al., "Novel Frame Interpolation Method for Hold-Type Displays", International Conference on Image Processing, 2004, vol. 3, pp. 1473-1476.

Sezan, et al., "Frame Rate Conversion of Motion Picture Films for Progressive-Scan HDTV", Signal Processing VI—Theories and Applications, Sixth European Signal Processing Conference, 1992, vol. 3, pp. 1279-1282.

Shin, et al., "High-Resolution Image Sequence Interpolation", Proceedings for IEEE TENCON. IEEE Region 10 Annual Conference on Speech and Image Technologies for Computing and Telecommunications, 1997, vol. 2, pp. 781-784.

Skoneczny, et al., "Classical and Neural methods of Image Sequence Interpolation", Proceedings of the SPIE, The International Society for Optical Engineering, 2001, vol. 4535, pp. 191-204.

Szostakowski, et al., "Missing frames interpolation by artificial neural networks," Engineering Benefits from Neural Networks. Proceedings of the International Conference EANN '98, 1998, pp. 82-85 (Abstract only).

Wang, et al., "A Fast Block-Based Motion Compensation Video Frame Interpolation", Conference Record of the Thirty-Eighth Asilomar Conference on Signals, Systems and Computers, 2004, vol. 2, pp. 1740-1743.

Wang, et al., "Comparison of Motion-Compensated Algorithms for Frame Interpolation", Optical Engineering, Feb. 2003, vol. 42, No. 2, pp. 586-590.

Wang, et al., "On Motion-Compensated Algorithms for Frame Interpolation", Proceedings of the Fourth IASTED International Conference on Signal and Image Processings, 2002, pp. 419-423.

Wittebrood, et al., "Tackling Occlusion in Scan Rate Conversion Systems", Digest of Technical Papers, International Conference on Consumer Electronics, 2003, pp. 344-345.

Yoon, et al., "Frame Interpolation Using Transmitted Block-Based Motion Vectors", Proceedings International Conference on Image Processing, 2001, vol. 3, pp. 856-859.

Zhai, et al., "A Low Complexity Motion Compensated Frame Interpolation Method", IEEE International Symposium on Circuits and Systems,2005, vol. 5, pp. 4927-4930.

Zhao, et al., "A New Algorithm for Motion-Compensated Frame Interpolation", IEEE International Symposium on Circuits and Systems, May 1993, vol. 1, pp. 9-12.

Baker, et al., "A Layered Approach to Stereo Reconstruction," Proceedings of Computer Vision and Pattern Recognition Conference, Jun. 1998, pp. 434-441.

Baroncini, et al. "The Image Resolution of 35mm Cinema Film in Theatrical Presentation," SMPTE Imaging Journal, vol. 113, No. 2&3, Feb./Mar. 2004, pp. 60-66.

Borcsok, et al. "Generation of 3D Image Sequences from Mixed 2D and 3D Image Sources," Sci 2001, the $5^{th}$ Multi-Conference on Systemics, Cybernetics and Informatics, Jul. 22-25, Florida, USA, 2001.

Burt, et al., "The Laplacian Pyramid as a Compact Image Code," IEEE Transactions on Communications, vol. 31 (4), pp. 532-540 (1983).

Debevec, et al., "Modeling and Rendering Architecture from Photographs: A Hybrid Geometry-and Image- based Approach," *Proceedings of SIGGRAPH '96*, New Orleans, Louisiana, Aug. 4-9, 1996, pp. 11-20.

Dunkley, "A New 3-D from 2-D Virtual Display Process," Proceedings of SPIE, vol. 1915, Stereo Displays and Applications IV, San Jose, Feb. 1, 1993, San Jose, CA, pp. 132-140.

Ernst, "Motion Compensated Interpolation for Advanced Standards Conversion and Noise Reduction," Signal Processing of HDTV, III, pp. 319-328 (Sep. 4, 1991).

Feldman, et al., "Interactive 2D to 3D stereoscopic image synthesis," *Proceedings of SPIE* vol. 5664 Stereoscopic Displays and Virtual Reality Systems XII, San Jose, CA, Jan. 17-19, 2005.

Garcia, "Approaches to Stereoscopic Video Based on Spatio-Temporal Interpolation," Proceedings of SPIE, vol. 2653, Stereoscopic Displays and Virtual Reality Systems III, Jan. 30-Feb. 1, 1996, San Jose, CA, pp. 85-95.

Hanna, et al., "Combining stereo and motion analysis for direct estimation of scene structure". In Proceedings IEEE International Conference on Computer Vision, Berlin, Germany, pp. 357-365, May 11-14, 1993.

Hanna, "Direct multi-resolution estimation of ego-motion and structure from motion". In Proceedings IEEE Workshop on Visual Motion, Nassau Inn, Princeton, New Jersey, Oct. 7-9, 1991, pp. 156-162.

Harman, "An Architecture for Digital 3D Broadcasting," Proceedings of SPIE, vol. 3639, Stereoscopic Displays and Virtual Reality Systems VI, Jan. 25-28, 1999, San Jose, CA, pp. 254-259.

Harman, "Home Based 3D Entertainment—An Overview," Proceedings of IEEE International Conference on Image Processing, Sep. 10-13, 2000, Vancouver, Canada, pp. 1-4.

Harman, et al., "Rapid 2D-to-3D Conversion," Proceedings of SPIE, vol. 4660, Stereoscopic Displays and Virtual Reality Systems IX, Jan. 21-24, 2002, San Jose, CA, pp. 78-86.

Healey, et al., "Global Color Constancy: Recognition of objects by use of illumination invariant properties of color distributions," Journal of the Optical Society of America a, 11(11):30033010, Nov. 1994.

Hoberman, "Depth Painting: the Interactive Transformation of Existing Images into Stereoscopic 3D," Proceedings of SPIE, vol. 2177, Stereoscopic Displays and Virtual Reality Systems, Feb. 8-10, 1994, San Jose, CA, pp. 78-85.

Hodges, "Tutorial: Time-Multiplexed Stereoscopic Computer Graphics," *IEEE Computer Graphics and Applications*, Mar. 1992, pp. 20-20.

Horry, et al. "Tour Into the Picture: Using a Spidery Mesh Interface to Make Animation from a Single Image," Proceedings of Siggraph '97, Aug. 3-8, 1997, LA, CA, pp. 225-232.

Kennel, "Digital Film Scanning and Recording: The Technology and Practice," SMPTE Journal, pp. 174-181 (1994).

Kim, et al., "Stereoscopic Conversion of Monoscopic Video by the Transformation of Verticalto-horizontal Disparity," Proceedings of SPIE, vol. 3295, Stereo Displays and Virtual Reality Systems V, San Jose, CA, Jan. 26-29, 1998, pp. 65-75.

Kim, et al., "Synthesis of a High-resolution 3D-stereoscopic Image Pair from a High Resolution Monoscopic Image and a Low-resolution Depth Map," Proceedings of SPIE, vol. 3295, Stereo Displays and Virtual Reality Systems V, San Jose, CA, Jan. 26-29, 1998, pp. 76-86.

Kumar, et al., "Direct multi-resolution estimation of ego—motion and structure from motion". in Proceedings IEEE Workshop on Visual Motion, Nassau Inn, Princeton, New Jersey, Oct. 7-9, 1991, pp. 156-162.

Kumar, et al., "Representation of scenes from collection of images," in Proc. IEEE Wkshp. on Representation of Visual Scenes, Cambridge, MA 1995.

Levinson, et al., "Development of an Autostereoscopic Monitor and 2D to 3D Conversion for Medical and Surgical Uses; Requirements, Clinical Trials and Degree of Acceptance," Proceedings of Spie, vol. 3639, Stereoscopic Displays and Virtual Reality Systems VI, Jan. 25-28, 1999, San Jose, CA, pp. 36-43.

Matsumoto, et al., "Conversion System of Monocular Image Sequence to Stereo using Motion Parallax," Proceedings of Spie, vol. 3012, Stereo Displays and Virtual Reality Systems Iv, San Jose, Feb. 11-14, 1997, pp. 108-115.

McAllister, "Stereo Pairs from Linear Morphing," Proceedings of SPIE, vol. 3295, Stereoscopic Displays and Virtual Reality Systems V, Jan. 26-29, 1998, San Jose, CA, pp. 46-52.

Morton, et al., "Assessing the Quality of Motion Picture Systems from Scene-to-Digital Data," Smpte Journal, vol. 111, No. 2, Feb./Mar., 2002, pp. 85-96.

Murata, et al., "A Real-Time 2-D to 3-D Image Conversion Technique Using Computed Image Depth," SID Symposium Digest of Technical Papers, May 1998—vol. 29, Issue 1, pp. 919-923.

Okino, et al., "New Television with 2D/3D image conversion technologies," Proceedings of SPIE, vol. 2653, Stereoscopic Displays and Virtual Reality Systems III, Jan. 30-Feb. 1, 1996, San Jose, CA, pp. 96-105.

Panabaker, et al. "IMAX HD—A High Definition Motion Picture System," 135th SMPTE Technical Conference, Oct. 29-Nov. 2, 1993, Los Angeles, CA.

R. Kumar, et al., "Direct recovery of shape from multiple views: A parallax based approach". In International Conference on Pattern Recognition, pp. 685-688 (1994).

Rotem, et al., "Automatic video-to-stereoscopic-video conversion," *Proceedings of SPIE* vol. 5664 Stereoscopic Displays and Virtual Reality Systems XII, San Jose, CA, Jan. 17-19, 2005.

Sawhney, "3D Geometry from Planar Parallax," In Proc. IEEE Computer Vision and Pattern Recognition Conference, Seattle, WA, Jun. 21-23, 1994.

Scharstein, "stereo vision for view synthesis," *IEEE Computer Society Conference on Computer Vision and Pattern Recognition (CVPR'96)*, pp. 852-858, San Francisco, CA, Jun. 1996.

Shao, et al., "Automatic 2D to 3D Footage Conversion for 3D Glasses-free Display Systems," ICCV 2003 demonstrations, Oct. 13-16, 2003.

Slater, et al., "The Illumination-Invariant Recognition of 3-D Objects Using Local Color Invariants," IEEE Transactions on Pattern Analysis and Machine Intelligence, 18(2):206-210, Feb. 1996.

Stiller, et al., "Estimating Motion in Image Sequences," IEEE Signal Processing Magazine, Jul. 1999, pp. 70-91.

Szeliski, "Scene Reconstruction from Multiple Cameras," Proceedings of IEEE International Conference on Image Processing, Sep. 10-13, 2000, Vancouver, Canada, pp. 13-16.

Tam, et al., "Stereoscopic Image Rendering Based on Depth Maps Created from Blur and Edge Information," *Proceedings of SPIE* vol. 5664 Stereoscopic Displays and Virtual Reality Systems XII, San Jose, CA, Jan. 17-19, 2005.

Valencia, et al., "Synthesizing stereo 3D views from focus cues in monoscopic 2D images," Proceedings of SPIE, vol. 5006, Stereoscopic Displays and Virtual Reality Systems X, Jan. 21-23, 2003, Santa Clara, CA.

International Preliminary Examination report for PCT/US2001/44995, dated Aug. 4, 2002.

International Search Report for PCT/US2001/44995, dated Apr. 4, 2002.

International Preliminary Examination Report for PCT/IB2003/00919, dated Mar. 24, 2004.

International Search Report for PCT/IB2003/00919, dated Dec. 8, 2003.

International Preliminary Examination report for PCT/IB2007/001726, dated Jan. 6, 2009.

International Search Report for PCT/IB2007/001726, dated Feb. 12, 2008.

International Preliminary Examination report for PCT/IB2007/000188, Jul. 29, 2008.

International Search Report for PCT/IB2007/000188, dated Jun. 26, 2007.

Chinese Patent Application No. 200780003734.3, Final Rejection mailed Jan. 29, 2012 (19 pages).

Chinese Patent Application No. 200780003734.3, Office Action mailed Jun. 24, 2011 (12 pages).

European Patent Application No. 07789439.2, Article 94(3) EPC Communication mailed Mar. 30, 2012 (5 pages).

European Patent Application No. 09153591.4, Article 94(3) EPC Communication mailed Feb. 10, 2012 (4 pages).

Japanese Patent Application No. 03810057.6, Decision Reversing Rejection of Application mailed Dec. 21, 2011 (35 pages).

U.S. Appl. No. 12/299,909, "Notice of Allowance", mailed Oct. 10, 2012, (31 pages).

European Patent Application No. 07789439.2, "Response to Article 94(3) Communication", filed Sep. 28, 2012, (22 pages).

Canadian Patent Application No. 2,636,858, Office Action mailed Feb. 19, 2014, 3 pages.

Chinese Application No. 200780003734.3, Office Action mailed Feb. 26, 2014, 6 pages.

Chinese Patent Application No. 200780003734.3, Office Action, mailed Aug. 12, 2013, 9 pages.

Aguirre et al., "Synthesizing stereo 3D views from focus cues in monoscopic 20 images", Proc. SPIE 5006, Stereoscopic Displays and Virtual Reality Systems X, 377, May 29, 2003.

Bergen et al., "Hierarchical model-based motion estimation", In Proceedings 2nd European Conference on Computer vision, 1992, 237-252.

Canadian Patent Application No. 2,653,815, Office Action, mailed Mar. 13, 2013 (4 pages).

\* cited by examiner

*Primary Examiner* — Brian D Nguyen
*Assistant Examiner* — Ashil Farahmand
(74) *Attorney, Agent, or Firm* — Kilpatrick Townsend & Stockton LLP

(57) ABSTRACT

The present invention relates to methods and systems for the exhibition of a motion picture with enhanced perceived resolution and visual quality. The enhancement of perceived resolution is achieved both spatially and temporally. Spatial resolution enhancement creates image details using both temporal-based methods and learning-based methods. Temporal resolution enhancement creates synthesized new image frames that enable a motion picture to be displayed at a higher frame rate. The digitally enhanced motion picture is to be exhibited using a projection system or a display device that supports a higher frame rate and/or a higher display resolution than what is required for the original motion picture.

42 Claims, 6 Drawing Sheets

METHODS AND SYSTEMS FOR DIGITALLY RE-MASTERING OF 2D AND 3D MOTION PICTURES FOR EXHIBITION WITH ENHANCED VISUAL QUALITY

CROSS REFERENCE TO RELATED APPLICATIONS

This application is the U.S. national phase of International Application No. PCT/M2007/000188 filed on Jan. 29, 2007 and published in English as International Publication No. WO 2007/085950 A2 on Aug. 2, 2007, which application claims priority to U.S. Provisional Application No. 60/762,964 filed on Jan. 27, 2006, the contents of both of which are incorporated herein in their entirety by this reference.

FIELD OF THE INVENTION

The present invention relates generally to methods and systems for enhancing a motion picture and more specifically to enhancing the resolution and quality of the motion picture.

BACKGROUND OF THE INVENTION

Motion pictures are composed of a sequence of image frames displayed to viewers at a fast frame rate. The perceived image resolution is a key indicator for the exhibition quality of a motion picture, and it is a combined result of both spatial resolution and temporal resolution. The spatial resolution measures the level of details within each image frame that can be perceived by audience, and it is determined by the quality of the display system as well as by the quality of motion picture content. The temporal resolution of a motion picture measures the level of motion smoothness of a moving image sequence, and it is determined by the frame rate at which the motion picture images are displayed. For cinematic presentations, the standard frame rate of a conventional motion picture is 24 fps (frames per second). However, there exists a number of higher frame rate motion picture formats. An example of presenting a motion picture digitally at a higher frame rate is generally described in U.S. patent application no. 2002/0149696 as a method of temporally interpolating motion images to a higher frame rate so the motion picture can be presented digitally at the original frame rate or a higher frame rate. The frame rate interpolation method may rely on motion vector analysis, such as the analysis used in Kodak's Cineon System. However, such system does not provide for digitally re-mastering an entire motion picture or producing acceptable image quality for cinematic or large format cinematic applications that demand relatively high visual and audio quality. For example, the system does not provide for artifact repair or sufficient processing speed to meet day and date release schedules.

Other examples of such high frame rate motion picture formats include Showscan (60 fps), ToDD-AO (30 fps) and IMAX® HD (48 fps). IMAX® HD is a 15-Perf/70 mm film format that captures and displays a motion picture at a frame rate of 48 fps. The first IMAX® HD film Momentum was produced by the National Film Board (NFB) of Canada and premiered at EXPO92 in Seville, Spain, in 1992. The study on the IMAX® HD technology was subsequently presented to 135th SMPTE Technical Conference in 1993. The study indicated that, compared with a standard IMAX® format using a frame rate of 24 fps, IMAX® HD dramatically improves image realism by enhancing clarity and sharpness, reducing film grain noise and virtually eliminating of motion artifacts like strobing and motion blur. The study further indicated that, even for still shots, the perceived image resolution was "notably greater than standard IMAX® (format)". The study provided evidence that temporal resolution enhancement through frame rate increase could improve perceived image resolution. Similar resolution improvement effects were later reported from the experiment work on two other 48 fps film-based projection formats. One of such format was a 3-Perf/35 mm format called MaxiVision, and the other was a 5-Perf/70 mm format called Super Dimension-70 (SDS-70) by Super Vista.

Over the past decade, relatively few motion pictures have been produced and exhibited at a frame rate higher than 24 fps. There are both economical and technical limitations that prevent a film-based motion picture from being produced at a higher frame rate. On the production side, shooting at a higher frame rate increases the film costs and production costs. More lighting may be needed on a set due to reduced exposure time as the result of using a higher frame rate, which contributes to the production cost increase. On the exhibition side, projecting at a higher frame rate significantly increases the complexity and the cost of a film projector as well as the cost of film prints. Because of those limitations, neither IMAX® HD nor other proposed higher frame rate film formats became financially viable for mainstream motion picture productions.

The advance of digital projection technology makes it possible to economically exhibit motion pictures at a higher frame rate. The Digital Cinema System Specification recently released by Digital Cinema Initiatives (DCI) includes 48 fps as a projection option. However, the cost of producing a motion picture at a 48 fps remains relatively high. One solution is to enhance the temporal resolution of a motion picture by converting the images to a higher frame rate. A frame rate conversion method actually creates synthesized image frames digitally based on the original image frames. Over the past decades, a number of frame rate conversion methods were developed for motion pictures and for video format conversion. These methods range from simple frame (field) repeating, frame (field) averaging to more complex methods such as motion-compensated frame interpolation. A motion-compensated (MC) method analyzes the motion of image elements across neighboring image frames and creates a synthesized new frames based on the estimated motion information. An MC method usually produces smoother motion than other methods.

A typical MC method has a motion estimator that calculates the movement of each image element of an image frame with respect to adjacent frames. An image element can be defined as a single pixel, a block of n×m pixels or a group of pixels describing an object. A single motion vector is normally used to indicate the direction and the strength of the movement of an image element from a present frame to a future frame. Sometimes, a pair of motion vectors is used to indicate the movement of an image element both from a present frame to a future frame and from the future frame back to the present frame. This is called bi-directional motion estimation. Motion vectors may not be sufficient to describe the movement of a group of pixels describing an object because the shape of the object may also change from a present frame to a future frame. In such a case, some forms of mathematical description of object shape warping may also be included along with motion vectors. There has been a plethora of MC methods proposed over the last decade for video format conversion. A majority of those methods can be fully automated with little or no need for human intervention. However, none of those methods are capable of producing adequate image quality required for motion picture applications.

Some algorithms have been proposed for converting a motion picture to a video format at a field rate of 50/60 fields per second. Such applications typically require fully automated algorithms ranging from standard 3:2 pulldown to motion-compensation based frame rate conversation (MC-FRC) algorithms. An MCFRC algorithm may create better image quality and smoother motion but it also produce other artifacts that result from motion estimation errors. The MCFRC algorithm generally includes three categories: (1) block-based methods; (2) object-based methods; and (3) pixel-based methods. The block-based methods can be implemented using common block-based motion estimation algorithms similar to those in MPEG and H.264/AVC codecs. The object based methods may produce fewer artifacts than others, but are generally not very stable. An example of an advanced object-based MCFRC algorithm is generally disclosed in U.S. Pat. No. 6,625,333. The pixel-based methods are generally computationally expensive.

Frame rate conversion methods are also used for creating special visual effects (VFX) such as to create slow motion, fast motion or variable-motion sequences, which are frequently practiced in the production of a motion picture, commercials and video. Examples of commercial software tools available for such VFX applications include ReTimer software by Realviz and TimeWarp software by Algolith. Retimer provides the ability to create digital "slow motion" or variable motion and allows users to edit rate curves and motion vector fields to achieve desirable results. Some such commercial software tools deploy some forms of MC methods. For instance, the MC algorithms behind ReTimer are based on block image elements, while the algorithms behind TimeWarp are based on object image elements, such as those developed by Communications Research Centre Canada (CRC) and described in U.S. Pat. No. 6,625,333. Such commercial software tools, however, are not designed for automated computation, and they reply on human users to provide user inputs interactively through a GUI. Furthermore, these software tools inevitably produce unacceptable artifacts due to problems like occlusion and motion estimation errors, and they do not provide efficient tools and methods to handle those problems. Although the resulting artifacts can potentially be fixed through manual fixes by skillful human users, the process is relatively labor-intensive, costly and time consuming.

Increasing the spatial resolution of each image frame can also improve the perceived resolution of a motion picture. A conventional motion picture shot on 35 mm negative film is limited to a spatial resolution of approximately 80 cycles per mm, or approximately 1,800 lines per picture height for 1.85 projection format. Due to the generational modulation transfer function (MTF) losses from standard film lab processes, the spatial resolution of a release film print is reduced to approximately 875 lines per picture height or lower.

The advance of digital cinema technology eliminates some major sources of MTF losses, especially those from the standard film lab process, so that it becomes feasible to present a motion picture with a higher perceived resolution than a typical release film print. The DCI Digital Cinema System Specification recommends that a digital motion picture be presented at a 2K or 4K format. A 2K digital format can theoretically support a spatial resolution up to 1,080 lines per picture height, while a 4K digital format can support up to 2,160 lines per picture height. However, the quality of a digital cinema presentation cannot be guaranteed unless the quality of motion picture image content can match the spatial resolution of a digital cinema system. Because of MTF degradations from various stages of the motion picture production and post-production processes, including capture, scanning, VFX and data compression, the resulting motion picture images may have a much lower spatial resolution than what can be supported by a digital projector.

It is a major challenge to improve the spatial resolution of motion picture images in order to produce a high quality cinematic experience, especially when a motion picture is to be presented in a large format cinema. A typical large format cinema, such as an IMAX® theatre, has a screen as large as 80 feet in height. In such a theatre, the audience seated much closer to the screen than in a conventional cinema. Delivering a satisfactory visual experience to the audience in such a theatre requires significant enhancement in image quality, such as the perceived resolution. Even when such enhancement methods are applied, it is difficult to complete all required processing within a relatively short time window in order for the enhanced motion picture to be released on schedule.

SUMMARY OF THE INVENTION

Certain aspects and embodiments of the present invention provide methods for digitally re-mastering a motion picture to achieve enhanced perceived resolution and visual image quality. The images of the motion picture can be enhanced through both spatial resolution enhancement and temporal resolution enhancement. Spatial resolution enhancement can be achieved though a combination of "motion-based" and "learning-based" spatial resolution enhancement methods. Temporal resolution can be achieved by computing motion vectors for every pixel in each motion picture sequence with relatively accurate motion estimation methods. Certain methods are designed to be implemented in a highly automated fashion with limited human interaction. Aspects of the present invention can be implemented with a system of one or more process-based devices.

Certain methods and systems of the present invention can be applied to two-dimensional (2D) and/or three-dimensional (3D) motion pictures. A 2D motion picture is a sequence of image frames, which can be either captured by a motion picture camera or created one frame at a time by computer graphics. Enhancement methods according to some embodiments of the present invention perform processes on digital data. Accordingly, if a motion picture already exists in a digital format, such as, for example, Source Master files, the image data may be directly used in the enhancement process. Motion picture in formats other than digital may be converted before the enhancement process. For example, if a motion picture is on film, it can be digitized to convert it into digital data through a film scanner.

A 3D motion picture creates illusion of both movement and depth based on the principle of stereoscopic vision. A 3D motion picture consists of two sequences of image frames, one representing a view from the left eye and one from the right eye. Those two sequences are typically referred to as the left-eye (L) images and the right-eye (R) images. The L images and R images can be synchronized such that one frame from each sequence captures an action in a given instant from left eye and right eye view points and they form an image pair called an L-R image pair. Some embodiments of the present invention can be applied to 2D and 3D motion picture data because the L and R images can be treated as two separate image sequences. Other embodiments of the present invention apply different enhancement processes to the 3D motion picture data, such as using information from one eye image, for example L, to improve processing results of the other eye image, for example R.

Some embodiments of the present invention provide methods for enhancing 2D motion picture sequences using 3D motion picture data. For example, either L image sequences or R image sequences may be created for output, but the correlation between L and R images may be used to enhance the image sequence.

One application of a digital re-mastering process, such as a spatial resolution enhancement process and a temporal resolution enhancement process, according to some embodiments is to enhance a conventional motion picture of 24 fps to be displayed at a frame rate of 48 fps or higher. Another application is to allow a motion picture to be captured at a lower frame rate, such as 12 fps, in order to increase the shooting time for a data storage device or a film roll. The resulting images can be enhanced to a normal frame rate of 24 fps or higher by embodiments of the disclosed digital re-mastering process. Other similar applications of the present invention should be apparent for those skilled in the art.

Embodiments of the present invention provide methods and systems for enhancing the perceived resolution of a motion picture through both spatial resolution enhancement and temporal resolution enhancement that meet the requirement for motion picture release schedules.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF THE INVENTION

Figure 1:
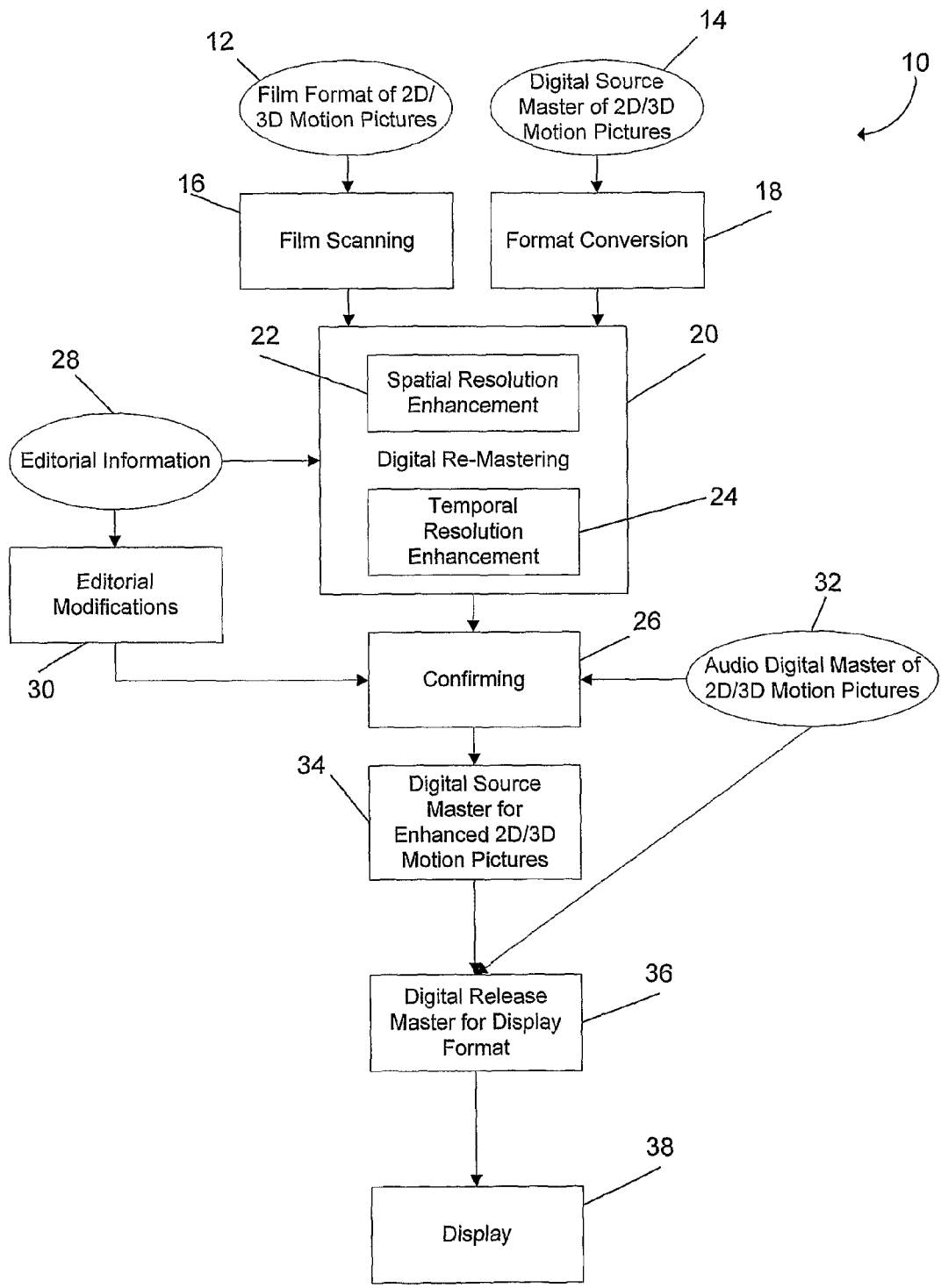
FIG. 1 is a flow diagram for digitally re-mastering a motion picture according to one embodiment of the present invention.

FIG. 1 shows one embodiment of a process 10 for enhancing motion picture image sequences. The process 10 starts by receiving motion picture image sequences that may be in a film format of 2D or 3D motion picture 12 or a digital source master of 2D or 3D motion pictures 14. If the motion picture is in the 2D or 3D motion picture film format 12, it is scanned using a film scanning process 16. If the motion picture is a digital source master 2D or 3D motion picture 14, the data can be used directly or can be converted into another digital format using a format conversion 18.

After film scanning 16 or format conversion 18, the motion picture sequence data includes image sequences or frames. The image sequences are then enhanced by a digital re-mastering process 20. The digital re-mastering process 20 can include a spatial resolution enhancement method 22 and a temporal resolution enhancement method 24, embodiments of which are described in more detail below. The spatial resolution enhancement method 22 can create image details that are absent in an image frame through image analysis. Two different spatial resolution enhancement methods may be used in order to achieve the desirable performance. One method can be a motion-based method in which additional image details are "stolen" from adjacent neighboring image frames through the analysis of the motion of image elements. The second method may be a learning-based method in which additional image details are "created" based on previously learned knowledge through the analysis of image feature space.

The temporal resolution enhancement method 24 may improve perceived resolution by adding synthesized new image frames through frame interpolation to increase temporal sampling rate or frame rate. The temporal resolution enhancement method 24 may include a MCFRC method that is relatively accurate and stable. The temporal method 24 may also be adapted to handle occlusion.

In some digital re-mastering processes, the motion picture image data are divided into smaller segments called shots. The shot segmentation process may use editorial information, available after the final cut of a motion picture is approved. With editorial information, image data can be divided into shots, and digital processing can be done independently for each shot. After digital re-mastering, editorial information 28 may need to be modified because of increased frame counts in each shot. With the modified editorial information 30, the enhanced shot segments can be put together in the right order. For example, after the motion picture data is enhanced, it undergoes a confirming process 26 that synchronizes the data in accordance with audio tracks 32. The confirmed enhanced image data is then converted into a standardized digital source master format 34, which can be similar to the original source master format, but with increased frame rate. Digital release master files 36 can then be produced, based on the digital source master files 34, for display 38 in theatres or further mastered into other distribution formats, including video and broadcasting. Audio 32 may also be combined to create the digital release master file 36. Data compression may be applied in creating the digital release master file 36 to meet the storage and bandwidth requirements of release platforms.

Enhancement of perceived resolution and visual quality of motion picture images are especially important for the release of a motion picture for large-format cinema venues that are capable of delivering substantially higher image resolution and visual quality. For that purpose, a frame from an enhanced motion picture has higher pixel resolution than what is needed for a conventional cinema. Converting a source master to a release master for a conventional cinema may require reduction in frame pixel resolution. The original audio files may also be digitally re-mastered to support a higher audio quality standard as required for a large-format cinema venue. The digital release master file may also be recorded back to film for distribution.

Figure 2:
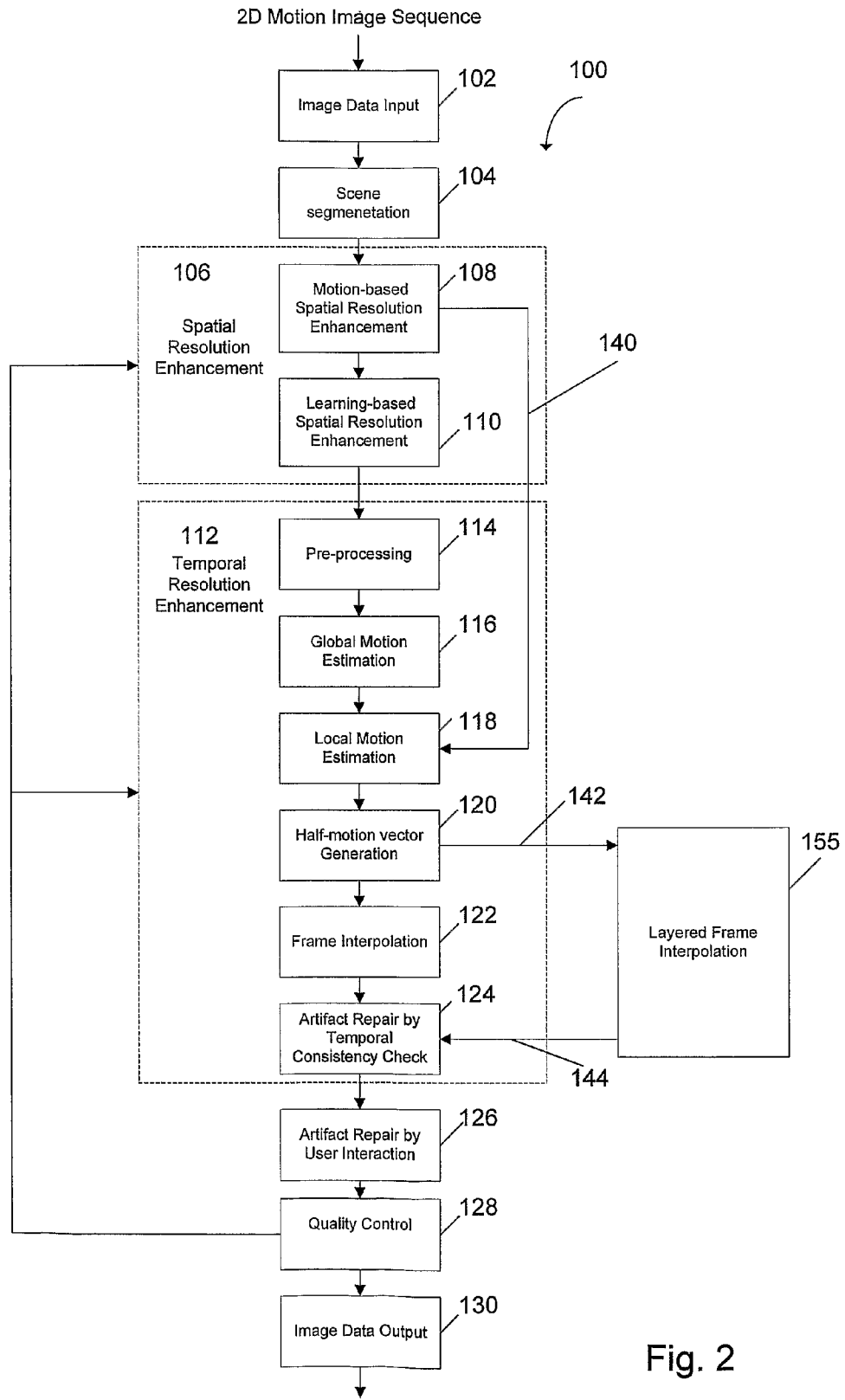
FIG. 2 is a flow diagram for digitally re-mastering a 2D motion picture according to one embodiment of the present invention.
Figure 3:
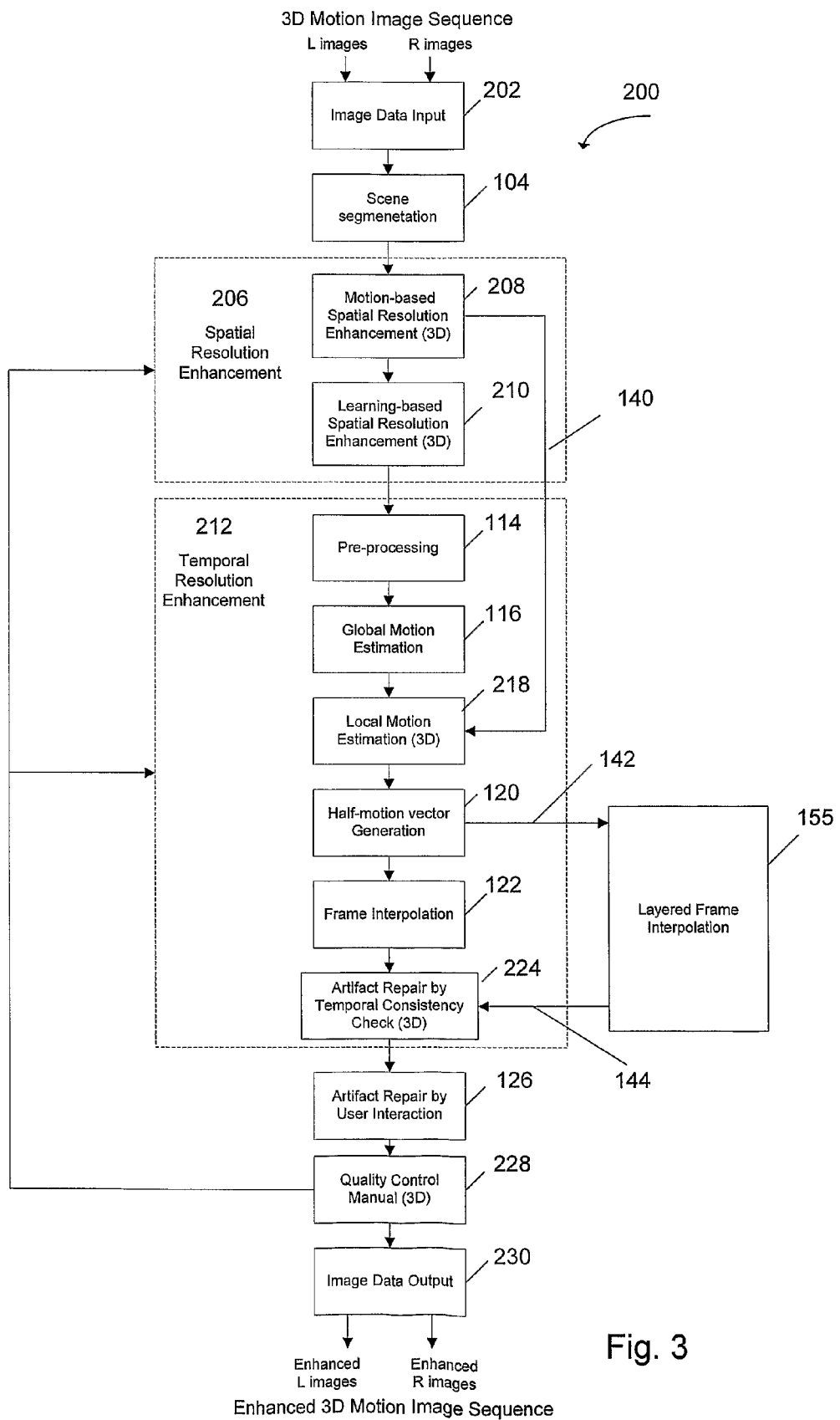
FIG. 3 is a flow diagram for digitally re-mastering a 3D motion picture according to one embodiment of the present invention.

FIGS. 2-3 show a process flow of creating a digital release master file with enhanced characteristics. FIG. 2 shows a process for enhancing 2D motion picture images while FIG. 3 shows a process for enhancing 3D motion picture images.

The processes shown in FIGS. 2-3 begin by receiving a 2D or 3D motion picture image sequence as an image data input 102. The 2D or 3D image sequence is either in digital format or converted, using a digitization process, to digital data if the image data is in a non-digital format, such as on celluloid film.

The digital 2D or 3D motion image sequence is then divided using a scene segmentation process 104. For example, the image sequence can be divided into shots, where each shot is a sequence of image frames representing a continuous action. Scene segmentation 104 assists in preparing the image sequences for enhancement that is preferably performed on a sequence of image frames with continuous action. Scene segmentation 104 can be performed automatically by detecting abrupt changes of image frame characteristics. Examples of such characteristics include color, intensity, histogram, texture and motion. If automated scene segmentation 104 is used, the entire motion picture data can be treated as a continuous sequence.

In some embodiments of the present invention, a motion picture is already separated into shots as a result of editing, and a shot list called an Edit Decision List (EDL) file is available. EDL records accurate information about every shot including time code data or frame count data representing the start and end of each shot. An EDL can be used to guide the scene segmentation process 104.

Spatial Resolution Enhancement

After scene segmentation 104, the motion picture image sequence is enhanced by a spatial resolution enhancement process. FIG. 2 illustrates a spatial resolution enhancement process 106 that can be applied to 2D image sequences, while FIG. 3 illustrates a spatial resolution enhancement process 206 that can be applied to a 3D image sequence. As described below, the spatial resolution enhancement processes 106, 206 may be applied differently, but both can include a motion-based method and a learning-based method.

Motion-Based Spatial Resolution Enhancement

The motion-based methods 108, 208 can enhance the spatial resolution of image sequences based on motion analysis. The motion-based methods 108, 208 may include three general steps: (1) motion estimation; (2) motion field regulation; and (3) detail recovery. Motion estimation may be based on a hierarchical motion model in which every image frame is represented by a multi-level pyramidal data structure. Each pyramidal data structure can represent a certain level of image details. At each pyramid level, a motion estimate of every pixel can be computed from all frames within a sliding temporal window using a variable-size block-matching algorithm. The resulting motion fields can be regulated using constraints such as high-frequency features, smoothness and quality measure. Each motion estimate can be assigned a reliability measure. Any pixel with a lower reliability measure can be considered for regulation to reduce estimation error. A group of synthesized frames are constructed by mapping each neighboring frame to the present frame based on computed motion estimates. In some embodiments, image details are recovered through adaptive temporal interpolation of synthesized frames within the temporal window. Temporal filtering may be performed using single-pass, multi-pass, or iterated process. The motion-based spatial resolution enhancement methods 108, 208 may be implemented as an automated distributed computing system controlled by a processor-based device, such as an intelligent controller. Motion-based methods are described in more detail in U.S. patent application Ser. No. 19/474,780.

For 3D motion picture image sequences, the motion-based spatial resolution method 208 can be applied to L and R image sequences separately. Furthermore, spatial resolution may be further improved using the correlation between the pixels of L and R image pairs, such as by estimating the disparity between L and R image sequences. Such estimating may include disparity estimation, disparity map regulation and detail recovery. Disparity estimation begins by correcting the horizontal misalignment between two image sequences. For each pixel in one image, for example the L image, a matching pixel in the other image, for example the R image, is located. Matching may be performed in the horizontal directions with limited allowance to accommodate the remnant vertical misalignment that may not be eliminated. Pixels for which a match is not found may be ignored. The disparity matching can be done in both directions in order to improve the accuracy of the resulting disparity map. A disparity map is generated for each L/R image pair. The disparity map can be further refined by removing local abnormalities using similar constraints as those used in motion regulation. A synthesized R image is then generated using the disparity map to be mapped on to the L image to improve its spatial resolution, and a synthesized L image is generated and mapped to the R image to improve its spatial resolution.

The motion estimates resulting from the above process can include multi-resolution motion vector fields, which can be stored and used as initial motion estimates 140 for a subsequent temporal resolution enhancement process.

Learning-Based Spatial Resolution Enhancement

Motion-based spatial resolution enhancement methods 108 may be effectively use for image sequences having relatively predictable motion. For images having relatively complex motion, the impact of detail enhancement diminishes as motion estimates become less accurate. In the embodiments illustrated in FIGS. 2-3, a learning-based method 110, 210 may be used to match each pixel of an image to a library of pre-selected image patterns having higher resolution and replace the pixel with a value calculated from a matching higher resolution pattern. The higher resolution patterns can be generated using a set of selected sample images that contain a higher level of image details than the original motion picture images. Such a library of higher resolution patterns is a high-resolution codebook and each pattern is described by a codeword.

The learning-based spatial resolution 110 can perform the following steps to enhance the spatial resolution of original image sequences. Each original image sequence is upsized to an intended higher resolution. A matching process is then applied to each pixel of the upsized image to find a matching codeword in a pre-set codebook. If a match is found, the pixel is replaced by the central pixel of the higher resolution image pattern associated with the matching codeword. After the above process is repeated for each pixel of an upsized image, the resulting enhanced image may need an additional pass of temporal filtering process to ensure temporal consistency with other enhanced image frames. This matching process can be extended to a block of pixels of the upsized images. For example, each block of pixels is matched to a codeword, and it is replaced by the matched higher resolution pattern through a transformation. A blending process can be applied to reduce the spatial discontinuity between the blocks. A temporal filtering process can also be applied to ensure temporal consistency.

A similar learning-based spatial resolution enhancement process 210 may be applied to a 3D motion picture. For example, the L and R images can share the same codebook. Resolution enhancement is then performed to each eye separately. A filtering process can be applied, using the disparity map produced in the motion-based resolution enhancement stage to remove inconsistency between resulting L and R images.

One implementation of the codebook generation process is described as follows. First, all higher resolution image patterns are downsized to the same pixel resolution of the motion picture images such that they share a similar level of image details. The level of image details is measured through Fourier spectral analysis. The downsized image patterns are then upsized to a higher pixel resolution in which the motion picture is to be presented. The resulting pattern forms a pair with the higher resolution image pattern from which it is produced. The upsizing processing may increase image pixel count and not create additional image details. A training process can be applied to all image pattern pairs to calculate and extract a number of image features from each image pattern pairs for each pixel from surrounding pixels. Image features having a higher level of image details can be described by a fixed number of data bytes or word. The collection of all features from each pair of image form a data set or codeword. The length of the codeword can be reduced using a principle analysis process to remove redundant feature attributes. The codewords are then collected into a data library or codebook and saved in a data storage. In some embodiments, the size and content of the initial codebook are dependent on the size and the content of the image patterns selected. A clustering analysis can be applied to the codebook to reduce the codebook size. The clustering analysis may group pixels having similar image patterns.

Temporal Resolution Enhancement

Figure 6:
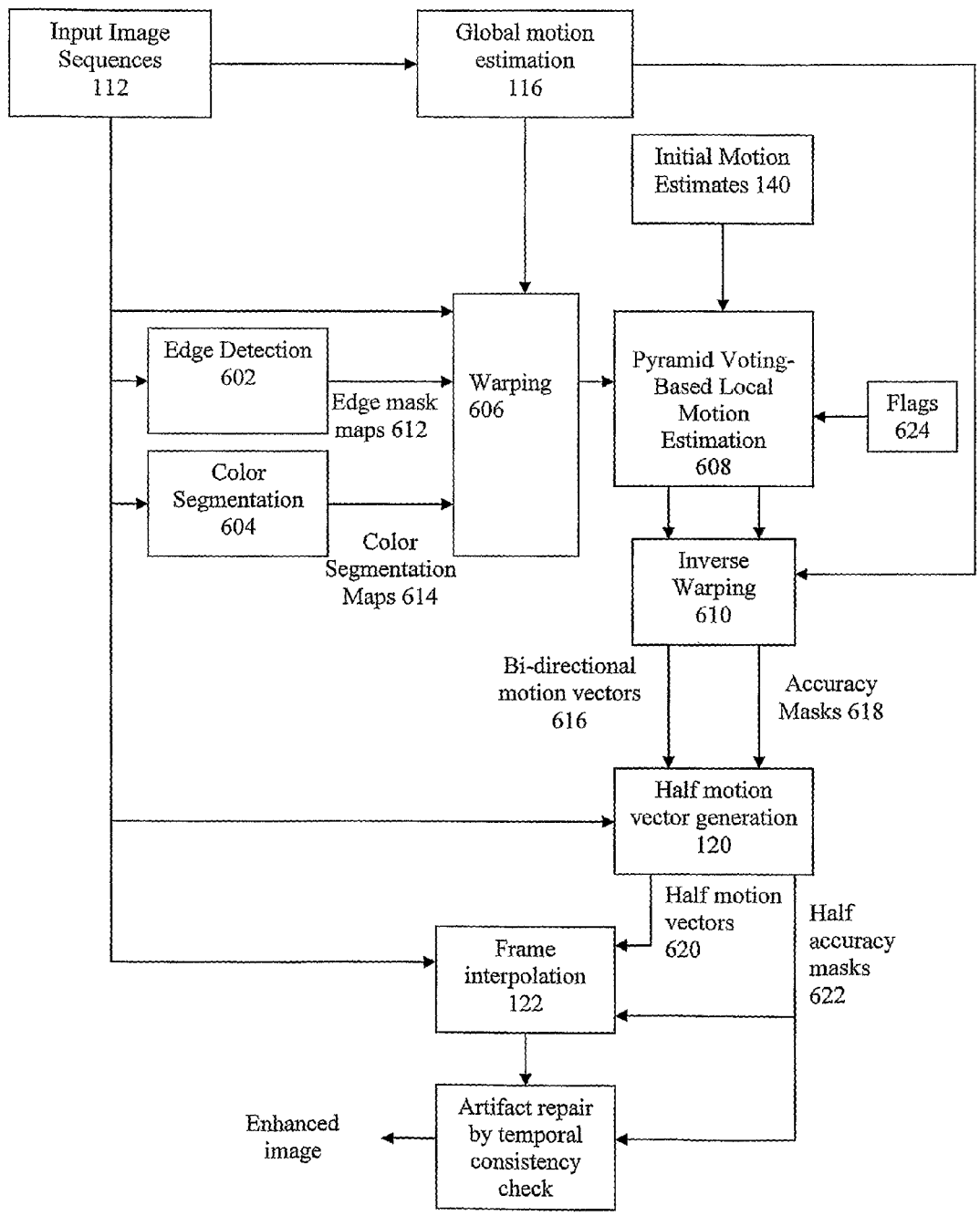
FIG. 6 is flow diagram of a temporal resolution enhancement process for the enhancement of motion picture image data according to one embodiment of the present invention.

The output of the spatial resolution enhancement processes 110, 210 are applied to temporal resolution enhancement processes 112, 212. The temporal resolution enhancement process 112, 212 can increase perceived resolution by increasing the display frame rate. Because original images have a fixed frame rate, new image frames need to be synthesized based on the original image frames to achieve frame rate increase. In some embodiments of the present invention, the temporal resolution enhancement processes 112, 212 may include pre-processing, global motion estimation, local motion estimation, half-motion vector generation, frame interpolation, and artifact repair by a temporal consistency check. Synthesized frames are created based on high quality motion estimates calculated by an embodiment of MCFRC method described below with reference to FIGS. 2-3 and FIG. 6.

Pre-Processing

First, the image sequence is pre-processed 114. Pre-processing 114 may be used to calculate edge mask maps and color segmentation maps from image frames. For example and referring to FIG. 6, edge mask map 612 can be generated from each frame of the image by an edge detection algorithm 602, such as a Canny edge detector. A color segmentation map 614 is then generated from each frame by a color segmentation algorithm 604, such as Meanshift or Watershed. For a 3D motion picture, separate edge mask maps 612 and color segmentation maps 614 are generated for each eye.

Global Motion Estimation

The global motion between adjacent frames is then calculated using a global motion estimation process 116. Global motion estimation 116 may be used to achieve relatively accurate local motion estimates. Approximate but correct global motion estimation 116 can be used to make a general first estimate for local motion estimation algorithms. Using global motion estimation 116, the motion of an image background can be computed using camera motion and depth information. If depth information is not available, such as for 2D or some 3D image sequences, global motion can be modeled approximately as a three-dimensional planar transform, which is a simplified version of three-dimensional perspective projection transformation and does not need depth information in calculation. An example of three-dimensional planar transform used in the method is shown here:

$$x' = \frac{a_1 x + a_2 y + a_3}{a_7 x + a_8 y + 1}, \qquad (1)$$
$$y' = \frac{a_4 x + a_5 y + a_6}{a_7 x + a_8 y + 1}.$$

where (x,y) and (x',y') are positions of a pair of matching feature points from two adjacent frames. The coefficients $a_1$, $a_2$, ..., $a_8$ are determined by fitting the three-dimensional planar model in equation (1) based on randomly tracked feature points. Feature points are computed based on standard 2×2 gradient cross correlation matrix $$G = \begin{bmatrix} S_{xx} & S_{xy} \\ S_{xy} & S_{yy} \end{bmatrix}, \qquad (2)$$
$$S_{xx} = \sum f_x^2,$$
$$S_{yy} = \sum f_y^2,$$
$$S_{xy} = \sum f_x f_y.$$

where $f_x$ and $f_y$ represent the local horizontal and vertical gradient, and the sums are taken over a small local region (3×3, 5×5, etc.) around each pixel. Feature points can be extracted by a number of methods. One method is to calculate the minimum Eigen value of matrix G, which is the basis of Kanada-Lucas Tomasi (KLT) feature detector. Another method is to calculate the maximum corner strength measure based on matrix G, which is the basis of another well-known Harris corner detector. Another method is to calculate the following values $P_{EG}$, $Q_{EG}$ and $\theta_{EG}$ which are derived from matrix G:

$$P_{EG} = \frac{(S_{xx} - S_{yy})^2 + 4S_{xy}^2}{(S_{xx} + S_{yy})^2 + \sigma_{EG}^4}, \qquad (3)$$
$$Q_{EG} = \frac{4(S_{xx} S_{yy} - S_{xy}^2)}{(S_{xx} + S_{yy})^2 + \sigma_{EG}^4},$$
$$\theta_{EG} = \arctan\left(\frac{S_{xx} - S_{yy} - \sqrt{(S_{xx} - S_{yy})^2 + 4S_{xy}^2}}{-2S_{xy}}\right).$$

The value of $P_{EG}$ represents the local edge scale, which can be used to generate edge mask values. The value of $Q_{ED}$ represents the response to local gradient changes, which can be used to locate feature points by calculating its local maximum. Among the pixels with local maximum, true feature points are not far away and they can be located by calculating the value of $\theta_{EG}$, which represents the orientation of the local gradient, and an energy measure V and searching for local maximum positions:

$$V = \sum_{0}^{2\pi} f(\theta_{EG}), \quad (4)$$

where $$f(\theta_{EG}) = \frac{1}{L(\theta_{EG})} \sum_{L(\theta_{EG})} \frac{yf_x - xf_y}{\sqrt{x^2 + y^2}}. \quad (5)$$

$L(\theta_{EG})$ is the projection length from centre pixel to the border of the local region. Because the local region is usually rectangle, this value varies depending on the angular values. Typically N directional angles are used, and N is usually set to 16 or larger. Feature points extracted though the above method need to be matched in pairs between adjacent frames. For a feature point in the current frame, it is matched to a feature point in the next frame to form a pair they have the highest correlation value.

Once feature points are faired, the coefficients of a three-dimensional planar transform (1) that models the global motion between any two adjacent frames can be calculated by randomly selecting at least four corresponding feature pairs from those two frames, each pair generating two linear equations such as:

$$\begin{bmatrix} x & y & 1 & 0 & 0 & 0 & -xx' & -yx' \\ 0 & 0 & 0 & x & y & 1 & -xy' & -yy' \end{bmatrix} \begin{bmatrix} a_1 \\ a_2 \\ a_3 \\ a_4 \\ a_5 \\ a_6 \\ a_7 \\ a_8 \end{bmatrix} = \begin{bmatrix} x' \\ y' \end{bmatrix}. \quad (6)$$

The selected 4 feature pairs produce eight linear equations, so that coefficients $a_1, \ldots, a_8$ can be solved. The resulting three-dimensional planar transform can be tested on all feature pairs and the transform as well as the number of inliers are saved for later use. Then the next four pairs of feature points are randomly selected and a three-dimensional planar transform is calculated and saved. This process is repeated over a sufficiently large of iterations. Among all three-dimensional planar transforms estimated from all iterations, the planar transform having the maximum number of inliers is selected as an initial estimation. The inliers are used to estimate a second three-dimensional planar transform using a standard least square algorithm. This step is repeated until the number of inliers becomes stable. The resulting three-dimensional planar transform is an estimate of the dominant global motion between those two frames. If other dominance global motions exist, they can be calculated in the same way from remaining unclassified feature points. The required computation for this algorithm depends on the number of feature pairs and is independent of the image frame size.

The most dominant motion between adjacent frames is usually the background motion, typically caused by camera motion. However, the motion of the foreground objects may become the dominant motion if the objects are large enough and move fast enough. In most cases, however, the background motion can be selected among dominant motions based on similarity in motion and percent of inliers among adjacent frames.

For 3D image sequences, separate global motion estimates may be performed for each eye. Where stereoscopic disparity between L and R images are relatively small, a single global motion estimates may be performed for both eyes.

Local Motion Estimation

A local motion estimation process, such as local motion estimation 118, 218, can then be applied based on edge mask maps 612, color segmentation maps 614, global motion estimation 116, and initial motion estimates 140 received from the motion-based spatial resolution enhancement process 108, 208. Local motion estimation 118, 218 can include a pyramid voting-based algorithm. The pyramid voting-based algorithm can synthesize new frames based on resulting local motion vectors. The new frames can be combined with spatially enhanced image frames to achieve a desirable frame rate.

The pyramid voting-based algorithms can further minimize errors during image sequence enhancement. A specific local motion estimation algorithm is usually optimized for a certain type of motion and may not remain accurate for other types of motion. In some embodiments of the present invention, a multiple of local motion estimation methods are used and a voting process is deployed to determine the best estimates and minimizing errors. In some of those methods, the motion estimates from the previous motion-based spatial resolution enhancement are used as initial estimates.

In one embodiment of the present invention, up to four local motion estimation algorithms or methods are used. One of the four algorithms is a block-matching method. The block-matching method includes dividing two adjacent image frames into small blocks. In one frame, its global motion is used as the initial guess and the average pixel shift of each block is calculated. A starting block in the second frame is determined and all blocks near the starting block are searched to find the best match based on minimum of block matching error. A motion vector is then assigned to each pixel in the first frame block that is equivalent to the shift of the block from the first frame to the best matching block in the second frame.

A second local motion estimation algorithm is a feature propagation method. The feature propagation method estimates the motion of feature points and the results are propagated to the rest of pixels of the entire image frame. The feature point pairs extracted for global motion estimation can be used. All feature pairs with low correlation values and large initial motion estimates are removed. Among the remaining feature pairs, those with duplicate correspondence are also removed. The remaining feature points are considered accurate and can be used as seed pairs. Based on the motion vectors of seed pairs, a propagation algorithm is applied to spread the motion to more pixels. In some embodiments, the pixel status from the previous analysis are recorded to assist in speeding up the process. Missing vectors are then filled based on color segmentation maps.

A third local motion estimation algorithm is a modified optical flow algorithm with control points and Lorenzo function. The control points are defined in a lattice grid and Lorenzo function is used to replace the standard Mean Square Error (MSE) to control errors. The method calculates horizontal and vertical gradients for each pixel of the next frame, determines the structure and distribution of the control points, and calculates weights of each pixel to the related control points. Starting from an initial guess of motion vectors of each pixel, motion vector modifications are computed for the control points. Motion vector modifications are computed for all pixels based on the control points. An energy cost function (motion tracking errors) is calculated using Lorenzo function. If the value changes are small, then the method stops, otherwise the computations are repeated until either value changes are small or the maximum number of iterations is reached.

A fourth local motion estimation algorithm is an integral block matching with multiple block sizes. In this method, initial motion estimates between two frames are used as starting points for pixel-based searching using block correlation values calculated using local central moments. For each pixel in the current frame, a matching pixel is found in the next frame based on the highest correlation values. This process is repeated for a multiple of different block sizes, resulting in a multiple of motion vectors for each block size for each pixel.

Each pixel in an image frame can have both forward motion vectors and backward motion vectors. The former are estimated by searching for matching pixels from the next frame, and the latter are estimated by searching in the reverse direction from the previous frame. All algorithms discussed are applicable in either directions, resulting in a multiple of forward motion vectors and a multiple of backward motion vectors.

A voting process is used to select a most accurate motion vector for each pixel from both forward and backward motion vectors. In one embodiment of the present invention, voting consists of the following schemes, each for a certain portion of both image frames. Scheme #1 is to select a motion vector by edge difference values, which is calculated based on the edge masks generated previously. For each motion vector associated with a certain block size, the normalized edge difference is calculated by summing the absolute edge differences of surrounding pixels within the block, and dividing by the absolute edge values of the block. A motion vector with a sufficiently small normalized edge difference value is selected and the motion vector is assigned to the pixel. If more than one motion vector has sufficiently small normalized edge differences, the motion vector obtained using the largest block size is selected. Selected pixels are marked with a relatively high accuracy value in a corresponding accuracy mask.

If Scheme #1 fails to find a motion vector, the next Scheme #2 is used to select a motion vector by coherence check. In this scheme, each pixel with a forward motion vector tries to find a corresponding pixel in the next frame with a corresponding backward vector to form a pair based on sufficiently small matching error. If a pair is found, the motion vector pair is assigned to both pixels and mark them with relatively high accuracy values in a resulting accuracy mask.

If Scheme #2 fails, the next voting scheme (Scheme #3) is used, which is also based on forward-backward checks. The corresponding backward motion vector is analyzed when a pixel is projected to the next frame based on a forward motion vector. If the backward motion vector has a relatively low accurate value, it is replaced with the forward motion vector with direction reversed because the former has a higher accuracy value. The accuracy value in the accuracy mask is modified accordingly.

If Scheme #3 does not produce a motion vector, the next Scheme #4 is used to select a motion vector based on minimum pixel color difference. If such a motion vector is found, corresponding pixels are marked with a relative low accuracy value in the accuracy mask.

For the remaining pixels, color segmentation maps are used to calculate an average for all motion vectors found previously in the same segmented region. The averaged motion vector is then used as a reference, and a motion vector that is both close to the reference motion vector and has minimum pixel matching errors is selected. This last voting method is Scheme #5.

Although five voting scheme are disclosed, those skilled in the art will realize that other voting schemes can be devised and added to the method for the purpose of producing a pair of forward and backward motion vectors with the highest possible accuracy for every pixel of every frame.

In the local motion estimation process 218 for a 3D motion picture, motion vectors can be estimated separately from L images or R images. However, because high correlations between L and R images exists, the motion estimates from one eye can be used as accurate initial motion estimates for the second eye. In one embodiment of the present invention, the motion vectors obtained from the L images are used as the initial motion estimates for the pyramid voting-based motion estimation process of the R images. This can improve the accuracy of the motion vectors for the R images and reduce inconsistency between L and R images.

A voting-based local motion estimation in a multi-level pyramidal structure in which image data at an upper level represents a coarse version of the image data, and the lowest level (level 0) represents the finest details of the image data can be relatively efficient and accurate. Such a pyramid representation of an image sequence is generated by progressively low-pass filtering and subsampling each frame. A similar pyramid representations is implemented in the motion-based spatial resolution enhancement methods 108, 208 discussed previously, which also produces multi-level motion estimates.

Pyramid voting-based local motion estimation methods 608 according to some embodiments of the present invention can be implemented at each pyramid level. For example, and referring to FIG. 6, an edge mask map 612, a color segmentation map 614 and global motion estimates 116 are generated for every frame at each level. Based on global motion estimates, all the data of the next frame (image data, the edge masks maps 612 and the color segmentation maps 614) are warped by a warping process 606 to the current frame to create warped data at each pyramid level.

All the voting schemes discussed previously can be applied to all pyramid levels with slight or no modifications. For example, Scheme #2 can be extended to checking coherence of multiple motion vectors produced by more than one method. At each pyramid level, if at least two motion vectors from different methods have very small matching errors, the motion vector produced by a method with a higher accuracy is selected or an average of those vectors is determined, and accuracy values in a corresponding accuracy mask 618 are updated accordingly.

For any pyramid level higher than level 0, both the motion vectors and accuracy masks can be progressively refined by using bilinear interpolation as the initial guesses of the next pyramid level. The accuracy mask values 618 are used as weights in the interpolation such that motion vectors with high accuracy values will be weighted more than those with lower accuracy in interpolation.

For the pyramid level 0, motion vectors need to be adjusted, taking pixel occlusion into consideration. An intermediate mask is created by projecting pixels from second image frame using backward motion vectors to the first image frame. This mask is then dilated to generate a traceable mask of the first image frame. Those pixels that cannot be traced from the second image back to the first image are considered occlusion pixels. For occlusion pixels, their motion vectors are adjusted using color segmentation-based averages. This step is repeated in the reverse direction from the second image frame back to the first image frame. If warping 606 is applied, the resulting bi-directional motion vectors 616 and accuracy masks 618 are warped back to normal by an inverse warping process 610.

The pyramid structure provides a possibility to select the performance of local motion estimation methods, ranging from maximum accuracy (using all multiple methods at all pyramidal levels) to maximum efficiency (using a single method at level 0). A 4-digit binary word called "flag" 624 is used to mark the combination of methods selected. For instance, a flag 624 having a value of 1010 can indicate that method #2 and method #4 are selected but method #1 and method #3 are not. More accurate results are achieved by selecting more methods but at same time increasing computational cost. At the upper levels, more methods can be used. As a result, higher accuracy are achieved at upper levels without significant increase in computational costs. If upper level motion estimates are highly accurate, it can also improve the accuracy of lower level motion estimates so that fewer methods may be needed for lower levels.

In the local motion estimation process 218 for a 3D motion picture, pyramid representations of L and R images can be obtained from the motion based resolution enhancement stage, and a voting-based motion estimation method similar to the pyramid voting-based local motion estimation 608 can be performed separately in L images and R images. However, because there exist strong correlations between L and R images, the motion estimates from one eye can be used as accurate initial motion estimates for the second eye. The motion vectors obtained from the L images can also be used as the initial motion estimates for the pyramid voting-based motion estimation process of the R images.

Half-Motion Vector Generation

A half-motion vector generation process 120 is then applied to the image sequences to convert the image sequence to a higher frame rate by synthesizing new frames at time intervals based on the desirable frame rate. Half motion vectors 620 are created based on bi-directional motion vectors 616 and the accuracy masks 618 to indicate the movement of pixels from an existing frame to a synthesized frame or otherwise. The term "half" is used here to indicate that the time interval of a synthesized frame is somewhere between two original image frames, and it does not restrict a synthesized frame to be created exactly half way between two original image frames. In a similar way, half accuracy masks 622 also created with respect to the time interval of a synthesized frame, which can be used later in frame interpolation.

Half-motion vector generation 120 generally assumes that a synthesized frame is to be created at a time interval in between a first image frame and a second image frame. However, half-motion vector generation 120 can be use when the frame rate is more than doubled and more than one synthesized frames are to be created between two image frames. A synthesized frame is created by projecting all pixels of an existing frame to the synthesized frame based on forward or backward motion vectors. For example, new forward motion vectors called "half forward motion vectors" are assigned from the first frame to the synthesized frame, and also from the synthesized frame to the second frame. Similarly, new backward motion vectors called "half backward motion vectors" are assigned from the second frame to the synthesized frame and from the synthesized frame to the first frame. If a pixel in the synthesized frame has both a half forward motion vector and a half backward motion vectors, it is considered accurate and marked accordingly in a half accuracy mask corresponding to the synthesized frame. If one of the half motion vector 620 exists, the pixel is considered an occlusion pixel and marked as such in the half accuracy mask 622. If a pixel that has neither half forward or backward motion vectors, it is considered inaccurate and marked accordingly in the half accuracy mask. The missing half motion vectors can be estimated from averaging the half motion vectors of neighboring accurate pixels. The resulting half accuracy mask can be used to locate potential artifact pixels in subsequent processing stages.

Frame Interpolation

Frame interpolation 122 is then performed using the half motion vectors 620 and the half accuracy masks 622. In a preferred embodiment of the present invention, frame interpretation 122 uses the pyramid representations of two adjacent images and their accuracy masks 618.

Frame interpolation 122 is generally applied to create a synthesized frame between a first image frame and a second image frame. A blank synthesized frame is first created in the same pyramid structure. The task of frame interpolation is to fill each pixel of the synthesized frame at each pyramid level with correct color values. Starting from a target pixel position in the synthesized frame of a certain level, the values of pixels at the same position and at the same level in both first and second frames are compared. If their values are sufficiently close, the averaged color is assigned to the pixel of the same position in the synthesized frame. This pixel is also marked as accurate.

If a color match cannot be found, the target pixel in the synthesized frame is projected to the first frame and to the second frame using corresponding half motion vectors and one color value from each frame is obtained. If those two color values are sufficiently close, the average of those two color values are computed and assigned to the target pixel. In addition, the pixel is marked as accurate. If those two color values are not sufficiently close, one projected pixel whose color values share is selected by a majority of its neighboring pixels, and the pixel is marked as an occlusion pixel.

If the target pixel has one half motion vector, either the half forward motion vector or the half backward motion vector, the pixel is assigned with the color values of the pixel projected using the available half motion vector. This pixel is marked as an occlusion pixel.

If the target pixel has no half motion vectors, accurate pixels are searched within a group of pixels at an upper pyramid level. Once found, the target pixel is assigned with color values obtained from a bilinear interpolation of those accurate pixels. If no accurate pixels are found within the neighborhood, the radius of the group of pixels is gradually expanded until it includes at least some accurate pixels and the target pixel is assigned with a bilinear interpolation of those accurate pixels.

The frame interpolation 122 process can create a synthesized image frame from two existing image frames. This process is repeated for the entire image sequence until a desirable frame rate is reached. The result is a temporally enhanced image sequence that contains both the existing image frames and synthesized image frames. Depending on the desirable frame rate, not all exiting image frames may be kept in the resulting enhanced image sequence. For example, to convert a standard 24 fps motion picture sequence to an output frame rate of 48 fps, a synthesized frame can be created in between each pair of neighboring image frames. As a result, nearly half of the image frames of the resulting enhanced image sequence are synthesized frames. In other cases where the output frame rate is not exactly a multiple of the original frame rate, a higher percentage (up to 100%) of image frames of an enhanced image sequence will be synthesized image frames.

The temporally enhanced motion picture can be synchronized with the original audio track when displayed at a higher frame rate. One or more additional synthesized frames may need to be added after the last existing frame of the image sequence to assist with synchronization. Those synthesized end frames are typically created from the last image frame. There are a number of ways of creating synthesized frames from a single image frame. One method is to create a duplicate of the frame. A second method is to generate half forward motion vectors from the image frame to the synthesized frames and fill all pixels of the synthesized frames.

A frame interpolation method based on more than two frames can significantly reduce the temporal inconsistency artifacts. In general, a temporal window with a length of 2M+1 frames is used to define the range of the image frames used for generating a synthesized frame. The length of the window can vary according to motion in an image sequence. A small window length is used for fast motion sequences and a relatively large window length is used for slow motion sequences.

Motion estimation is done between a frame immediately before the synthesized frame and every previous frame, and between a frame immediately after the synthesized frame and every future frames. The same pyramid voting-based motion estimation method can be used between each pair of frames and generate both forward and backward motion vectors.

Half motion vectors 620 are generated between the synthesized frame and every other image frames within the temporal window using the same method as disclosed previously. The pixel value of the synthesized frames can be calculated by a weighted average of all projected pixels that exist.

For image sequences that contain fast motion, it becomes more challenging to enhance temporal resolution because motion estimates computed using the method described above become less accurate. Some embodiments of the present invention provide a layered approach 155 for dealing with scenes with fast motion. The layered approach 155 segments images into different motion layers and groups image elements that share similar motion into the same layer.

The half motion vectors 620 estimated from the previous methods can be used for motion segmentation. Each original image frame is divided into small blocks. The motion representing each block is estimated by an affine motion model, which is calculated through the least square algorithm based on motion vectors of all pixels of the block. The fitting error is calculated to evaluate if the motion model is a good fit or a poor fit. For all good fitting blocks, their affine motion parameters are collected. Clustering algorithms are applied to cluster the affine motion models into a small number of classes representing the dominant motions in the whole image.

With the dominant motion classes, each pixel is mapped to the closest motion class based on its motion vector. Then all pixels that belong to the same motion class are grouped into a segment. If a segmented region that is too small, it can be merged with a larger neighboring segment. If two segments have similar affine motions, they can be merged into one region. If a region has an affine motion model fitting error too large to stay as one region, it can be split into two regions, each having a distinct affine motion model. This segmentation process is repeated until the regions become stable or the maximum of iterations are reached.

A final motion segmentation mask is created for each frame containing the segmentation index for all pixels. The segmentation mask defines the layer structure for image pixels of each frame.

The motion segmentation results, including the motion segmentation mask and the affine motion model parameters, can be used as the initial estimation for the segmentation of the next frame. With the initial estimation, and the same processes as described previously are repeated until the next frame is segmented. This process is repeated until the motion segmentation masks are created for all original images.

The motion segmentation masks for a synthesized frame can be interpolated from the motion segmentation masks of original frames using "AND" or "OR" operation. Within each layer, a global motion homography matrix for the layer is calculated and each frame is warped to its neighboring frame based on the global motion homography matrix before applying pyramid motion tracking. Finally new layered images are generated through interpolation at each layer using tracked motion vectors.

Based on the motion segmentation masks, a new synthesized image frame is created through composition of all layered images.

Compared with the layered approach 155, the frame interpolation method 122 described above can be considered as a single layer approach. Global motion estimation is applied for each layer in a layered approach so that the resulting motion vectors are relatively accurate. The layered approach can reduce artifacts occurring in the edge and occlusion areas.

Artifact Repair by Temporal Consistency Check

Any visible artifacts can be repaired through temporal consistency check 124, 224 equipped with an automated occlusion detection and occlusion fill capability. The synthesized frames may contain artifact pixels, and the most visible ones are those that are inconsistent with their neighboring frames including original image frames. The temporal consistency check 124, 224 can automatically identify and repair temporally inconsistent artifacts by checking temporal consistency.

Artifact pixels of a synthesized frame are those that are marked as anything but "accurate" in corresponding half accuracy masks generated from the previous process. Those artifact pixels can further be grouped by their "visibility" within a temporal window. An artifact pixel is "visible" if it can be "seen" from another frame if it can be projected onto that frame using a half motion vector and with a sufficiently small matching error.

Artifact pixels can be grouped by their visibility. For example, the first group can include pixels which are visible from a majority of frames within a temporal window. The second group can include those pixels which are visible from fewer than 50% of past frames within the window. The third group can include those pixels that are visible from fewer than 50% of future frames within the window. The artifact pixels of the first group can be considered non-occlusion pixels, while the other two groups can be considered occlusion pixels. Half accuracy masks can be used to group artifact pixels. Artifact pixels as identified can be automatically removed.

Artifact pixels that are inconsistent temporally produce the most objectionable artifacts. Although those artifacts can be repaired by a skilled user interactively with conventional painting, cloning or compositing software tools, the process is nevertheless time consuming and labor-intensive. The present invention discloses a far more efficient method of repairing temporally inconsistent artifacts.

Half accuracy masks 622 can be used to group artifact pixels. For a pixel of the first group, pixel-matching errors are calculated with the pixel's projected pixels in past and future frames within the temporal window. If the matching error for a certain frame is noticeably larger than others, the pixel is marked as an artifact pixel. For a pixel of the second group, the pixel matching error is check with its projected pixel in future frames. If the matching error for a certain frame is noticeably larger than others, the pixel is marked as an artifact pixel. For a pixel of the third group, the temporal consistency check is done to past frames within the temporal window and the pixel is marked as an artifact pixel if the matching errors are large. For all identified artifact pixels, repair is performed by automatically replacing the pixel with the average color values of all projected pixels in corresponding past and/or future frames.

The artifact repair process 224 for a 3D motion picture can repair artifacts from inconsistencies between L and R images, and can identify such artifacts by checking L-R consistency. For example, a stereo matching process is applied to each L-R image pair, and depth information can be estimated. The resulting depth maps are temporally interpolated to create depth maps for synthesized frames. Using interpolated depth maps, the pixels in the synthesized L and R images are checked and inconsistent pixels are marked and repaired using corresponding pixels from the other eye or directly from other frames of the same eye.

The artifact pixels that are survived from the previous temporal consistency check 124, 224 can be further reduced or removed interactively by, for example, merging pixels of different versions. Different versions of a pixel are created under different flags and merged to reduce artifacts. In a GUI environment, a user can review different versions of enhanced image sequences and select the best version or merge a number of selected versions together to generate a new version containing fewer artifacts.

As described in more detail below, artifacts may also be repaired by user interaction 126, such as providing access to the data on a processor-based device having computer-executable code that allows users to repair the data.

Quality Control

Figure 4:
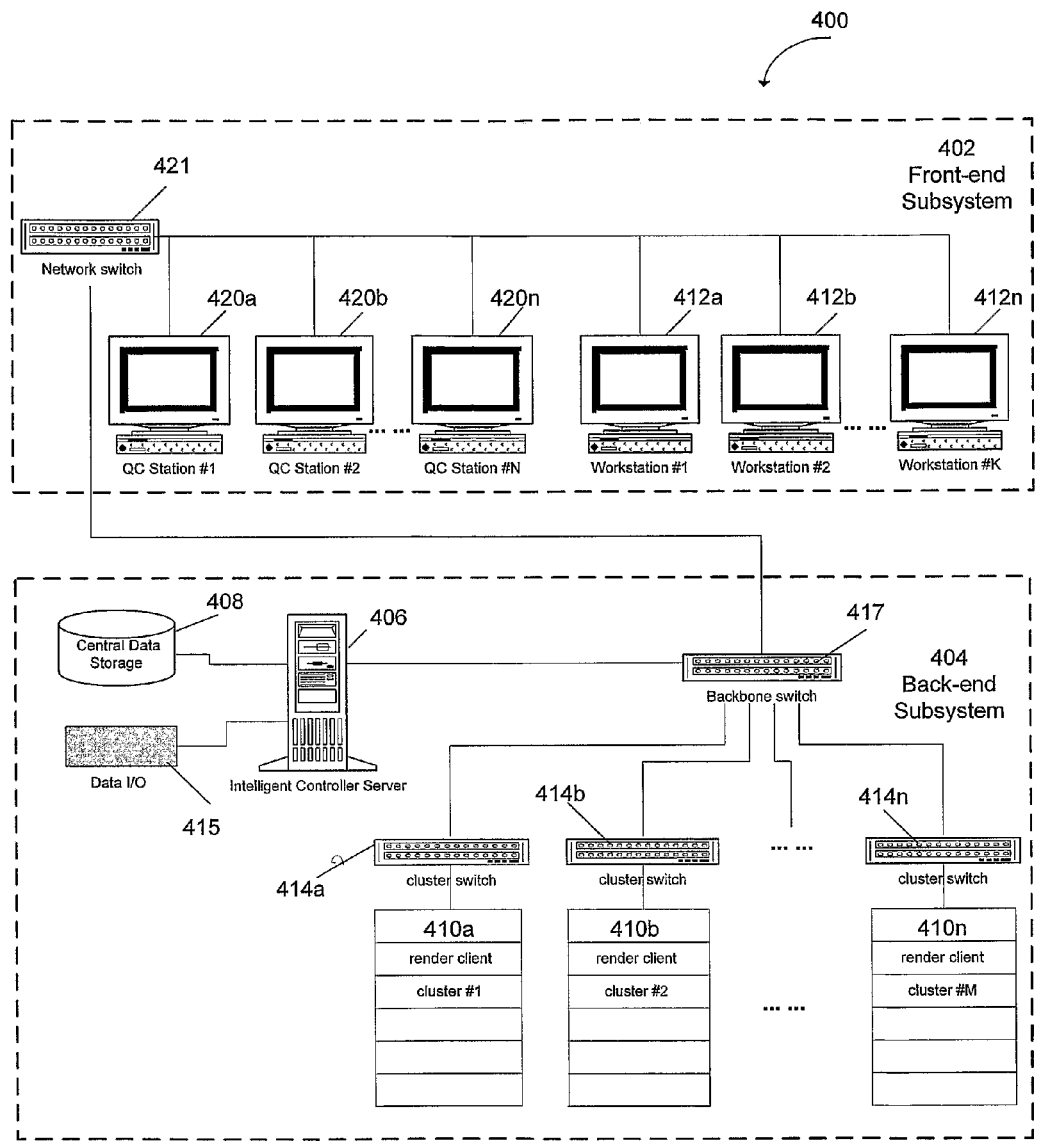
FIG. 4 is a layout of a system for digitally re-mastering a motion picture according to one embodiment of the present invention.

The Quality Control (QC) 128, 228 is a process in which a trained human operator visually examines the enhanced image sequences to decide if the resulting quality is acceptable. As shown in FIG. 4, the QC process 128, 228 can be performed on a QC station 420. The QC station 420 can be, for example, a workstation equipped with a high-quality display system, a sufficiently large disk storage and software that allows the operator to perform all functions needed for QC inspection. The display system can be a 2D display system or a stereoscopic 3D display system or a system that supports both 2D and 3D. The enhanced image sequences are sent to the QC station 420 by a central server that hosts an Intelligent Controller (IC) 406 once the required processing is completed, and the tracking software tells the operator which sequences are available for QC inspection. If the operator identifies an artifact, he or she can report the nature of the issue back to the IC 406 through the QC software that provides necessary user inputs. The sequence is then reprocessed with adjustments based on the inputs of the operator, which may require the certain frames to be re-processed by the automatic processing using a new set of parameters or may require using different artifact removal methods by a human operator. The re-processed image data can be brought back by the IC 406 to the QC station 420 for further inspection. This process is repeated until the resulting quality is seen as acceptable and then the processing is completed. The operator can notify the IC 406 that the sequence is acceptable, and the image data is ready for output.

A completed and accepted image sequence can be a series of files on a central server, such as IC 406. These files have a standardized file format and serve as the source master files for the re-mastered motion picture. Upon output 130, 230 or release of a motion picture, the source master files are converted to release master files for cinematic releases. The format of release master files may depend on the release display platform deployed in a theatre. For a standardized digital cinema release, the release master files may be directly used for exhibition. For other non-standardized digital releases, the release master files may be converted to an appropriate digital file format for exhibition. For film-based exhibition, the release master files (or the source master files) can be recorded onto an appropriate film format for a film print release. There are a myriad of file types and compression schemes in the digital realm that the source master files can be converted to release master files. In a typical release process, the release master files need to be written to a tape or external disk storage for transporting to cinemas or for archival purposes. The IC can schedule the work required for file format conversion based on a priority scheme established by users. An example of a priority scheme could be to prioritize certain sequences, like movie trailers, that appear before the main motion picture presentation. The specific release master format, the compression scheme used and the priority scheme for each cinema presentation are tracked by the IC so that the location and status of each motion picture release is known to the overall Production.

The digital re-mastering methods can be implemented as a highly automated production computing system. FIG. 4 illustrates one embodiment of a computing system 400 implemented as a combination of two subsystems: a front-end system 402 that mainly supports applications that require user interaction and a back-end system 404 that can be totally automated. Both subsystems use a combination of networked software and hardware. Both hardware and software are monitored and controlled through a central software entity or Intelligent Controller (IC) 406 on a server.

The back-end subsystem 404 includes the IC 406, a central data storage 408 and many distributed render clients 410*a-n* forming a render farm. A data input/output 415 may be associated with the IC 406 in the back-end subsystem to provide access to the IC 406 for loading computer-executable code such as software and otherwise configuring the IC 406. The back-end subsystem 404 may also include cluster switches 414*a-n* and a backbone switch 417 for controlling data flow over the network. The render farm may have any suitable number of render clients 410*a-n*. Most computing tasks can be carried out in the back-end subsystem 404, and those tasks can include: automated scene segmentation, motion-based spatial resolution enhancement, learning-based spatial resolution enhancement, and a majority of tasks of temporal resolution enhancement. The IC 406 performs various control and tracking functions. A number of daemons run on this server, continuously monitoring for work or updates required and performing them independently.

The IC can perform functions in three main areas:
  Monitor the physical hardware and data, tracking all system resources being used and available;
  Respond to queries from users providing real-time reports; and
  Launch processes on data as actions are required and as system resources become available.

The IC 406 can internally represent the state of all data and processes ran or being run for a production. All processes running, whether automatic machine tasks or manual human operator actions, report back their progress and status back to this IC 406. It monitors a central data storage 408 for data that is newly available as well as data that has been processed and may be ready for tape backup. The IC 406 can be queried to obtain accurate real-time information as the progress of a production or a single shot.

IC 406 information can be accessed remotely from any machine with network access to the IC 406. For example local front-end workstations 412*a-n* or external computers or communication devices can remotely communicate with the IC 406 over the Internet. The information accessed is user specific enabling a level of security and access available to each individual. The information is reported through fixed reports or a proprietary 'query builder' that allows users to create their own reports. They can control the search criteria for the results and also set what information they wish to have returned for the matched objects.

The IC 406 can track processing at three general levels: Frame, Shot, and Production.

Examples of attributes tracked at a frame level include:
render clients used to run the various processes on the frame;
process completion status, e.g. waiting to run, completed, and running;
times that processes occurred or were queued for each frame; and
frame dimensions, file type, and bit depth.

Examples of attributes tracked at a shot level include:
processes that have been or are needed to be performed on the shot;
shot information i.e. length, other names the shot may be referred to by external productions or companies, descriptions, and keycode on film when recorded;
parameters set, specific to those processes;
track and monitor changes requested for a shot by an approver;
user identification that manipulated the shot;
times of completion of any stages or processes to the shot;
version control—signing in and out by users;
shipping information; and
film-recording information such as times, and recorder used.

Examples of attributes tracked at a production level include:
shipping information;
users' assigned work;
users' past completed work; and
production statistics, e.g. completion percentage, estimated completion times, and frequency of multiple versions of shot.

The IC 406 is also responsible for launching all the processes applied to the data. When system resources become available the IC 406 allocates the processing to the many distributed render clients 410*a-n*, preferably in an optimal manner based on need and resources. Each render client 410*a-n*, once instructed to run a job, is responsible for pulling all image data it requires from the central data storage 408, executing required operations on each frame and pushing the enhanced image data to a temporary location at controller data storage 408. For a job that was distributed to multiple render clients 410*a-n*, the IC 406 assembles the rendered segments from render clients 410*a-n* into a continuous shot. The IC 406 also checks the integrity of the assembled data for occasional missing frames or incomplete frames in the shot. If missing frames or incomplete frames are discovered, the IC 406 sends a request to the same render clients for re-rendering of those frames. The communication between the IC 410 and render clients 410*a-n* is crucial for render efficiency.

The IC 406 tracks the current state of each render client 410*a-n* and constantly monitors for available processors. In the eventuality of failure of a render client 410*a-n*, the IC 406 raises an alert for repair. It reroutes the job to other available render clients 410*a-n* for processing. A diagnostics process ensures that there is no loss of data during the transfer. If the IC 406 experiences a failure, the state of the system before malfunction is preserved. In one embodiment of the present invention, the IC 406 re-starts by killing all processes that are running on render clients 410*a-n* and re-assigns jobs to each render client 410*a-n*. In another embodiment, the IC 406 polls the render clients 410*a-n* for their status, finds their current states and resumes the control. This is a more complicated re-start scheme, but no re-rendering of data is required.

In one embodiment of the present invention, the IC 406 comprises the following software components:

Scheduler—monitors for processes needing to be run on data. It manages render job distribution and assigns jobs to specific render clients 410*a-n* based on a pre-determined load-balancing scheme. If there are multiple available candidates, the IC 406 checks the network traffic load distribution among render client clusters and selects a render client (or render clients) 410*a-n* from the cluster (or clusters) with the lowest traffic load. For each job in a queue, it may assign it to a single render client 410*a-n*, especially when there are more jobs waiting in the queue than the number of available render clients, or it may assign the job to a multiple of render clients 410*a-n*, especially when the job needs to be completed as quickly as possible.

Auto Launch—monitors for data becoming available for processing. Usually with processing the data is assembled and a command is launched on the data. Actions or processes are set to be run on any number of shots (or all shots of a film) at the start of the production. As our processes are self-setting, that is, they intelligently analyze the data to pick optimal settings and parameters independently, no human interaction is required. The Auto Launch then, monitors the physical hardware and network for data to become available. Once all components are available it submits a request to the Scheduler to launch the processes on that particular data. This optimizes the workflow, resulting in no lost time between data being ready to process and the launching of the required processes.

File Setup—monitors data that is complete and is required in another physical location or format. Often during a production, data is required to be available in different formats. The File Setup daemon monitors files and their status for any different versions or formats needed. If required it will process the data into the necessary format and also transfer it physically to another location. This has some useful applications. Primarily it optimizes the workflow by having all data available in all required location and formats in the minimum amount of time. It can also be used to create intelligent caching on the overall system so as to improve network performance and sped up user interaction. An example of this is that the IC 406 knows which data a user will be working on the next day and which front-end workstation will be used. A proxy version of the data can be transferred locally to the workstation in off-peak hours to be available immediately for the user and to eliminate the resource use during a busier time.

Tape Writer—monitors for finished data that is required to be backed up to tape and writes it. The daemon is in constant contact with the other elements of the IC 406 and so is aware when data is both required and available for tape backup. It can independently write the data to a tape and report the relevant information of tape name and write times back to the central database.

The front-end subsystem 402 can include a number of computer workstations 412a-n and a number of QC stations 420a-n, each capable of being manned by an operator or artist. The front-end subsystem may also include a network switch 421 for controlling and otherwise assisting dataflow through the network. The workstations 412a-n are standard desktop computers and run a combination of custom software as well as commercially available applications. The computing tasks performed at the front-end subsystem 402 include inputting of EDL information in scene segmentation, quality control in both the spatial and temporal resolution enhancement processes and artifact repair.

All applications running on the front-end machines are connected through a network connection to the back end control software. Any changes or updates made are reported back to the back end processes where the state of each shot and the overall production is stored. Examples of this communication include the signing out and signing back in of data, completion of a human manual task on data etc. The operators on the front-end machines can also query the IC 406 explicitly to obtain information regarding the processing and status of the production.

One software application provided by the front-end workstations 412a-n primarily is a tool for artifact repair. A human operator can highlight the problem area and use a number of methods to remove the artifact. The methods include:
  manual painting, either with information from the same frame or another frame from the sequences;
  automated painting that used either, or both, spatial and temporal analysis to remove unwanted results; and
  a combination of manual painting and automatic analysis that intelligently provides suitable data to be painted in by the operator, removing the artifact.

Figure 5:
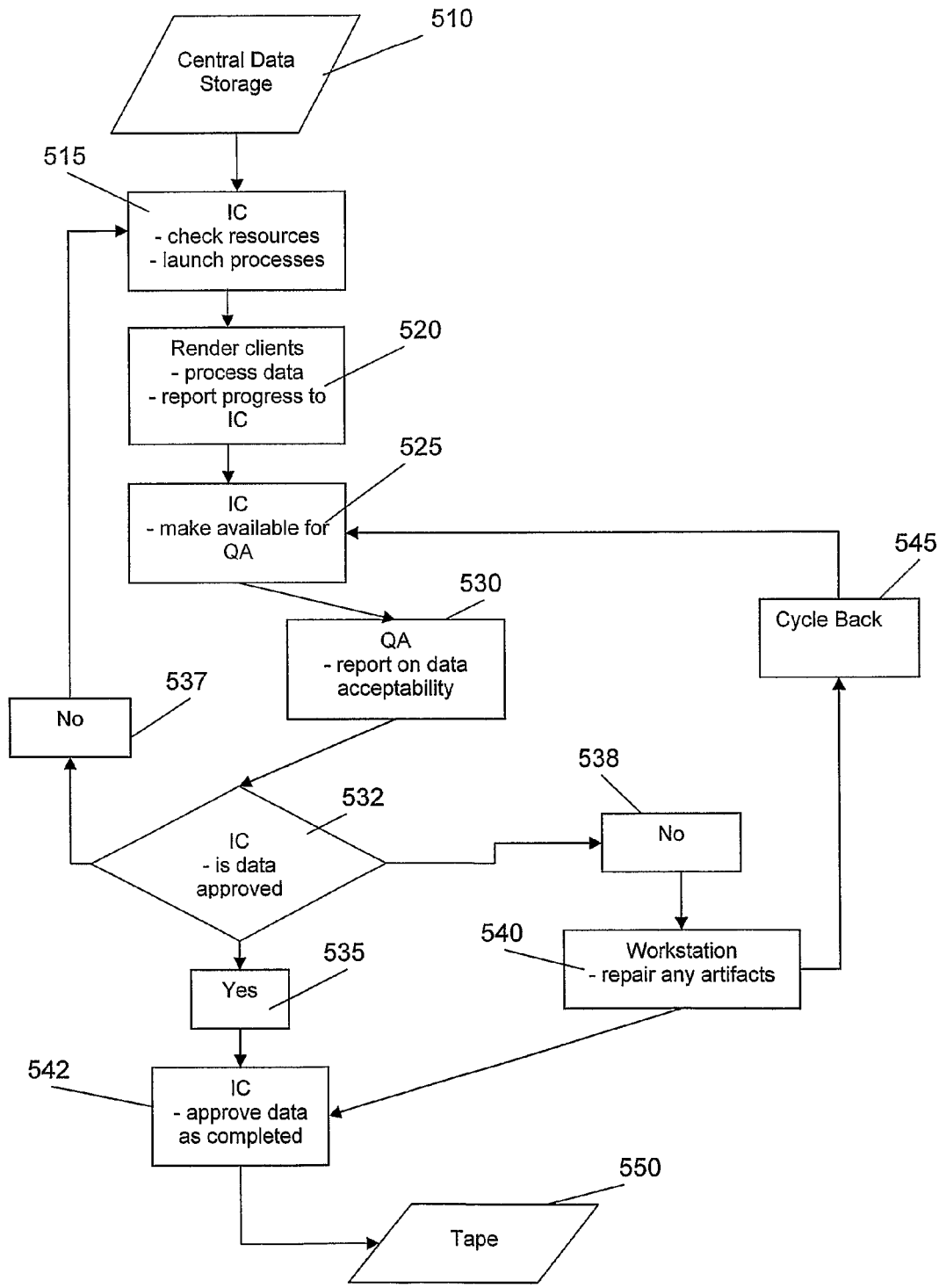
FIG. 5 is a flow diagram of data in a system for digitally re-mastering a motion picture according to one embodiment of the present invention.

The image data flow of a typical motion picture re-mastering production between the front-end and back-end subsystems is depicted in FIG. 5. The overall workflow is as follows.

Scene editorial information, an edit description list (EDL) file can be input into the IC. This enables the 'Auto Launch' to map the input digital frames from the original production to discrete individual shots that will run through the system. The digital data that is input may be, for example, a series of numbered files scanned from film (e.g. frame.0001.cin, frame.0002.cin . . . ) or could be arbitrarily named files from a digital color grading process, where there are many different types of file prefixes and numbering schemes.

The IC for this production begins to monitor the system in preparation for performing tasks. For example, the IC may obtain whether data and system resources are available to run the re-mastering processes and data needs to be moved or somehow reformatted.

After set-up processes, image data from the source production is provided to the central data storage in step 510 where it can be seen by the IC. The data can arrive in many ways such as a tape format, disk drives or arrays, directly from a scanner output, etc.

In step 515, the IC notices the data is available and consults the editorial information input for this particular production. If some required grouping of data is complete on disk, (all frames from a shot), then the source data is segmented into groupings of similar frames called shots based on the editorial information. Once the original data is divided into a complete shot the IC queues the shot for re-mastering, known as a 'job', to be run on the distributed processors. The 'Scheduler' observes that there are jobs queued for processing and so splits the shot among the render clients. This means taking a shot and dividing it up to run in pieces, separately on different remote processors.

In step 520, the remote processors or render clients, receive their jobs and report back that they are beginning the processing. They copy the shot data required to their local drives, for example the frames from the range of the shot they have been assigned. The render clients can automatically analyze the data in order to decide on the best procedure to run and the optimal settings for those processes. Once complete the render client runs the required processes at the optimal settings for that data.

In step 525, the render clients transfer back the finished data to the server and report to the IC that they are finished processing and that the range of frames assigned to it are ready for the next step of the workflow. They also report to the IC that they are available for more work.

Alternatively, the analysis processes are separated from the executing processes. For example, an analysis job being queued with the IC is run first on the render clients and the results are passed back to the IC. From this point the actual processing is then queued with the parameters established by the analysis and the IC then splits and assigns the re-mastering processes to the remote processors. This can add efficiency and consistency in analyzing once per shot, trading off against sub-shot adjustment in parameters for possibly more accurate results if there is a great variance within a shot.

In step 530, the IC transfers preview data of the re-mastered frames to a front-end quality control workstation (QC stations) for quality assurance and inspection. All work and data flow up to thus point has occurred in the back end of the System. At this point the work is passed to the front end. The IC informs the user or System Manager that there is data waiting to be viewed. A trained quality control operator views the data and has a few options based on their findings. They then must tell the IC their decision usually by setting the status of a shot within the front-end software they are evaluating the data with.

In step 532, the operator can inform the IC that the data is accurately processed and complete and therefore is approved or decide that the data needs additional automated processing and the nature of the re-processing needed.

If additional processing is indicated, the shot is then queued again for analysis and processing with the suggestions of the operator translated by the IC into parameter influences for the automatic analysis in step 535. The job is given a higher priority to run sooner and faster so as to not cause bottlenecks in the flow of a project through the workflow. These two decisions pass the control of the shot back to the back end of the workflow. The third decision retains the control in the front end.

If no additional processing is indicated, the data is set to move to storage, such as tape backup, disk backup, film-recording, digital projection mastering or any variety of end display manipulation in step 550. The system can then output the data, such as with a data I/O device.

In step 538, the operator can decide that the shot requires some front end, user-assisted fixing of residual artifacts. The IC then transfers data to the necessary local front-end workstations for user-assisted repair of the shot. The IC assigns any data marked for human manual artifact repair to available repair operators much as it would assign work to the remote processors or render clients. The same optimizations of workflow can be achieved with the human operators by either splitting shots into multiple jobs across many people to speed up the completion or to make maximum use of idle workstations.

In step 540, a repair operator works on their assigned job and when complete, submits them back to the IC Server.

In step 542, data can be considered 'approved' by the human operator or, in step 545, can be cycled back through to the front-end QC stations for further quality assurance and inspection.

In step 550, the IC watches for completed jobs and assembles any shots that have been split across multiple workstations. Once a compete set of frames or a shot has completed all processing and is approved. The IC monitors for completed data compared to required shipments and transfers any data that fulfills the criteria to the final stage. This can include processes such as tape or disk backup for shipping, film-recording, digital display or any number of display end processes.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of this invention.

What is claimed is:

1. A method for enhancing the quality of a motion picture image sequence, the method comprising:
    receiving an original motion picture image sequence comprising digital data of a plurality of image frames;
    creating additional image details at multiple levels of image details and generating a first enhanced image sequence by applying a spatial resolution enhancement process to the original image sequence; and
    generating a second enhanced image sequence by applying a temporal resolution enhancement process to the first enhanced image sequence using frame interpolation by adding at least one synthesized image frame to the first enhanced image sequence, wherein the at least one synthesized image frame is created based on computed local motion vectors determined by a voting-based method applied to multiple initial local motion estimates for every pixel at each level of a multi-level representation of each image frame of the first enhanced image sequence, wherein the temporal resolution enhancement process includes creating synthesized image frames based on motion estimates calculated using a local motion estimation process that comprises:
        calculating an edge mask map and a color segmentation map for each image frame;
        warping the edge mask map and the color segmentation map using a global motion estimate for every pixel of each image frame;
        generating multiple motion vectors for each pixel of each image frame using multiple local motion estimation methods;
        computing forward and backward motion vectors for each pixel; and
        applying a voting process to select a motion vector for each pixel,
    wherein the second enhanced image sequence has a greater frame rate than the original image sequence and the second enhanced image sequence has greater image detail than the original image sequence.

2. The method of claim 1, further comprising:
    synchronizing the second enhanced image sequence to an audio track for the original image sequence.

3. The method of claim 1, wherein the original motion picture image sequence and the second enhanced image sequence are two-dimensional (2D) sequences.

4. The method of claim 1, wherein the original motion picture image sequence and the second enhanced image sequence are three-dimensional (3D) sequences.

5. The method of claim 1, wherein the original motion picture image sequence is in 3D and the second enhanced image sequence is in 2D.

6. The method of claim 1, further comprising:
    dividing the original motion picture image sequence into shots; and
    performing the enhancement processes on each shot.

7. The method of claim 1, wherein the original motion picture image sequence comprises a single shot.

8. The method of claim 1, further comprising:
    formatting the second enhanced image sequence to a display presentation format; and
    synchronizing the formatted enhanced image sequence to an audio track for the original image sequence.

9. The method of claim 1, wherein the spatial resolution enhancement process comprises:
    a motion-based spatial resolution enhancement process; and
    a learning-based resolution enhancement process.

10. The method of claim 9, further comprising:
    applying the motion-based spatial resolution process to a three-dimensional (3D) image sequence, wherein applying the motion-based spatial resolution process comprises:
        disparity estimation;
        disparity map regulation; and
        detail discovery.

11. The method of claim 1, wherein the spatial resolution enhancement process is a learning-based spatial resolution enhancement process that comprises:
    generating a codebook comprising codewords, each codeword being associated with a pattern having a higher resolution than the plurality of image frames of the original motion picture image sequence;
    applying a clustering analysis to reduce the size of the codebook;
    upsizing an image frame of the original motion picture image sequence to the higher resolution, the image frame comprising a plurality of pixels;
    matching each pixel of the upsized image to a codeword; and
    generating an enhanced pixel by replacing a pixel by a central pixel of the pattern associated with a matching codeword.

12. The method of claim 1, wherein the spatial resolution enhancement process is a learning-based spatial resolution enhancement process that comprises:
    generating a codebook comprising codewords, each codeword being associated with a pattern having a higher resolution than the plurality of images of the original motion picture image sequence;
    applying a clustering analysis to reduce the size of the codebook;
    upsizing an image frame of the original motion picture image sequence to the higher resolution, the image frame comprising at least one block of pixels;
    matching each block of pixels of the upsized image to a codeword;

replacing the block of pixels by the pattern associated with the matched codeword using a transformation process to create an enhanced block of pixels;
applying a blending process to the enhanced block of pixels; and
applying a temporal filtering process.

13. The method of claim 1, wherein the temporal resolution enhancement process further comprises:
pre-processing;
global motion estimation;
local motion estimation;
half-motion vector generation; and
artifact repair by temporal consistency check.

14. The method of claim 13, wherein each image frame comprises a plurality of pixels, the global motion estimation comprising:
a. computing a gradient cross correlation matrix for each pixel;
b. calculating at least one feature point for each pixel based on the gradient cross correlation matrix;
c. matching at least one of the calculated feature point to a feature point of a next frame in the image sequence;
d. selecting at least four matched feature points;
e. estimating global motion based on the selected feature points; and
f. interactively repeating steps d and e by selecting different matched feature points until a global motion estimate is obtained for each pixel.

15. The method of claim 13, wherein artifact repair by temporal consistency check comprises:
identifying artifact pixels by half accuracy masks;
grouping artifact pixels by visibility;
checking temporal consistency based on grouping; and
automatically repairing temporal inconsistent artifact pixels.

16. The method of claim 13, further comprising a layered frame interpolation process.

17. The method of claim 1, wherein each image frame comprises a plurality of pixels; and
wherein the voting-based method comprises:
applying at least one local motion estimation method to each pixel;
computing forward and backward motion vectors for each local motion estimation method; and
selecting a motion vector for each pixel from the forward and backward motion vectors using the voting process.

18. The method of claim 1, wherein the at least one local motion estimation method comprises at least one of:
a block matching method;
a feature propagation method;
a modified optical flow method; or
an integral block matching method.

19. The method of claim 1, wherein the voting-based method is a pyramid voting-based method in which image data is represented in a multi-level structure and voting at a higher level of the multi-level structure produces a coarse version of the motion vectors that are refined to a lower level of the multi-level structure using interpolation.

20. The method of claim 1, wherein the voting process comprises at least one of:
selecting a motion vector by different edge values;
selecting a motion vector by coherence check;
selecting a motion vector by minimum matching errors;
selecting a motion vector through forward and backward checks; or
selecting a motion vector using color segmentation maps.

21. The method of claim 1, wherein creating the synthesized image frames comprises:
generating half-motion vectors;
determining a time interval of a synthesized image frame between a first image frame and a second image frame;
assigning half-forward motion vectors and half-backward motion vectors to each pixel of the synthesized frame; and
generating a half-accuracy mask corresponding to the synthesized frame, the half-accuracy mask marking a status of each pixel.

22. The method of claim 21, wherein the frame interpolation further comprises:
receiving the half-motion vectors and half-accuracy masks generated from at least two image frames;
creating the at least one synthesized image frame based, at least in part, on the half-motion vectors and half-accuracy masks;
generating synthesized frame pixels by interpolation and averaging;
inserting the synthesized frame pixels into the synthesized image frame; and
generating the second enhanced image sequence having the at least one synthesized image frame.

23. The method of claim 22, further comprising:
maintaining synchronization with an audio track of the original image sequence by adding the at least one synthesized image frame.

24. The method of claim 22, wherein the at least one synthesized image frame is created using more than two of the plurality of images.

25. The method of claim 1, further comprising removing artifacts by user interaction.

26. The method of claim 25, wherein removing artifacts comprises merging different versions of synthesized frames.

27. The method of claim 1, wherein the global motion estimates are computed from a global motion estimation process that comprises:
a. computing a gradient cross correlation matrix for each pixel;
b. calculating at least one feature point for each pixel based on the gradient cross correlation matrix;
c. matching at least one of the calculated feature point to a feature point of a next frame in the image sequence;
d. selecting at least four matched feature points;
e. estimating global motion based on the selected feature points; and
f. interactively repeating steps d and e by selecting different matched feature points until the global motion estimates are obtained for each pixel.

28. A system for enhancing the quality of a motion picture image sequence, the system comprising:
a back-end subsystem comprising:
a central data storage for storing an original motion picture image sequence comprising digital data of a plurality of image frames;
a render client configured to:
create additional image details at multiple levels of image details and generate a first enhanced image sequence by applying a spatial resolution process to the original motion picture image sequence; and
generate a second enhance image sequence by applying a temporal resolution enhancement process to the first enhanced image sequence using frame interpolation by adding at least one synthesized image frame to the first enhanced image sequence, wherein the render client is configured to create the least one synthesized image frame based on computed local motion vectors determined by a voting-based method applied to multiple initial local motion estimates for every pixel at each level of a multi-level representation of each image frame of the first enhanced image sequence, wherein the temporal resolution enhancement process includes creating synthesized image frames based on motion estimates calculated using a local motion estimation process that comprises:
calculating an edge mask map and a color segmentation map for each image frame;
warping the edge mask map and the color segmentation map using a global motion estimate for every pixel of each image frame;
generating multiple motion vectors for each pixel of each image frame using multiple local motion estimation methods;
computing forward and backward motion vectors for each pixel; and
applying a voting process to select a motion vector for each pixel; and
an intelligent controller for controlling the render client and accessing the central data storage,
wherein the second enhanced image sequence is configured to have greater frame rate and greater detail than the original motion picture image sequence.

29. The system of claim 28, further comprising:
a front-end subsystem comprising a workstation for communicating with the intelligent controller, the workstation being adapted to receive user input and interaction in repairing artifacts in the second enhanced image sequence, performing a quality control check of the second enhanced image sequence, and segmenting the original motion picture image sequence.

30. The system of claim 29, wherein the workstation comprises multiple workstations.

31. The system of claim 30, wherein at least one of the multiple workstations comprises a quality control workstation.

32. The system of claim 28, wherein the original motion picture image sequence and the second enhanced image sequence are in 2D.

33. The system of claim 28, wherein the original motion picture image sequence and the second enhanced image sequence are in 3D.

34. The system of claim 28, wherein the original motion picture image sequence is in 3D and the second enhanced imaged sequence is in 2D.

35. The system of claim 28, wherein the render client is adapted to examine the quality of the second enhanced image sequence.

36. The system of claim 28, wherein the intelligent controller comprises a processor and a memory comprising executable code, the executable code comprising:
a scheduler;
a auto launch;
a file setup; and
a tape writer.

37. The system of claim 28, wherein the render client comprises multiple render clients.

38. The system of claim 37, wherein the intelligent controller is adapted to detect a system failure and shut down each render client and re-assign a job to each render client.

39. The system of claim 37, wherein the intelligent controller is adapted to monitor the render clients to prevent re-rendering of data.

40. A method for enhancing the quality of an original motion picture image sequence, the method comprising:
receiving a three-dimensional (3D) original motion picture image sequence;
applying a spatial resolution enhancement process to the 3D original image sequence to create an enhanced image sequence, the spatial resolution enhancement process comprising:
a motion-based spatial resolution enhancement process; and
a learning-based resolution enhancement process comprising:
generating a codebook comprising codewords, each codeword being associated with a pattern having a higher resolution than the original image sequence;
applying a clustering analysis to reduce the size of the codebook;
up sizing an original image of the original image sequence to the higher resolution, the original image comprising a plurality of pixels;
matching each pixel of the upsized image to a codeword; and
replacing each pixel by a central pixel of the pattern associated with the matched codeword,
wherein the enhanced image sequence has greater image detail than the original image sequence.

41. The method of claim 40, further comprising:
applying the motion-based spatial resolution process to a 3D image sequence, wherein applying the motion-based spatial resolution process comprises:
disparity estimation;
disparity map regulation; and
detail discovery.

42. A method for enhancing the quality of an original motion picture image sequence, the method comprising:
receiving a three-dimensional (3D) original motion picture image sequence;
applying a spatial resolution enhancement process to the 3D original image sequence to create an enhanced image sequence, the spatial resolution enhancement process comprising:
a motion-based spatial resolution enhancement process; and
a learning-based resolution enhancement process comprising:
generating a codebook comprising codewords, each codeword being associated with a pattern having a higher resolution than the original image sequence;
applying a clustering analysis to reduce the size of the codebook;
upsizing an original image of the original image sequence to a higher resolution, the original image comprising at least one block of pixels;
matching each block of pixels of the upsized image to a codeword;
replacing the block of pixels by the pattern associated with the matched codeword using a transformation process to create an enhanced block of pixels;
applying a blending process to the enhanced block of pixels; and
applying a temporal filtering process,
wherein the enhanced image sequence has greater image detail than the original image sequence.

* * * * *